US010329783B2

(12) United States Patent
Sansom, III et al.

(10) Patent No.: US 10,329,783 B2
(45) Date of Patent: Jun. 25, 2019

(54) PORTABLE RESTROOM ASSEMBLY WITH HANDS-FREE DOOR OPENING SYSTEM

(71) Applicant: Sansom Industries LLC, St. Louis, MO (US)

(72) Inventors: Clyde Sansom, III, St. Louis, MO (US); Henry Brown, Portage, WI (US)

(73) Assignee: Sansom Industries LLC, St. Louis, MO (US)

( * ) Notice: Subject to any disclaimer, the term of this patent is extended or adjusted under 35 U.S.C. 154(b) by 0 days.

(21) Appl. No.: 15/294,593

(22) Filed: Oct. 14, 2016

(65) Prior Publication Data

US 2017/0107730 A1   Apr. 20, 2017

Related U.S. Application Data

(60) Provisional application No. 62/242,036, filed on Oct. 15, 2015, provisional application No. 62/291,256, filed on Feb. 4, 2016, provisional application No. 62/318,345, filed on Apr. 5, 2016.

(51) Int. Cl.
*E04H 1/12* (2006.01)
*A47K 11/02* (2006.01)

(52) U.S. Cl.
CPC ............ *E04H 1/1216* (2013.01); *A47K 11/02* (2013.01); *Y02A 50/454* (2018.01)

(58) Field of Classification Search
CPC ...... E04H 1/1216; A47K 11/02; Y02A 50/454
USPC ................................................... 4/477, 476
See application file for complete search history.

(56) References Cited

U.S. PATENT DOCUMENTS

| 1,014,213 | A | * | 1/1912 | Fitzgerald | ............... | A47K 11/02 |
| | | | | | | 4/473 |
| 2,238,513 | A | | 4/1941 | Ward et al. | | |
| 3,601,821 | A | | 8/1971 | Corsiglia | | |
| 4,922,557 | A | * | 5/1990 | Harding | ................. | A47K 11/04 |
| | | | | | | 4/218 |
| 4,991,256 | A | | 2/1991 | Jeynes et al. | | |
| 5,500,962 | A | * | 3/1996 | Tagg | ..................... | E04H 1/1216 |
| | | | | | | 4/449 |

(Continued)

FOREIGN PATENT DOCUMENTS

BR   202012029494-5 U2   9/2014

OTHER PUBLICATIONS

International Search Report and Written Opinion of the International Searching Authority dated Mar. 31, 2017, for International Appln. No. PCT/US16/57217 filed Oct. 14, 2016, 18 pages.

*Primary Examiner* — Benjamin R Shaw
(74) *Attorney, Agent, or Firm* — Boardman & Clark LLP

(57) ABSTRACT

A portable restroom is provided. The portable restroom offers features providing users with temporary toilet functions in a physically and emotionally secure environment while offering the owner/operator a cost-effective means of providing service. The portable restroom accomplishing the foregoing objectives includes the features of: improved ventilation; devices for no-touch sanitary safety practice; devices which facilitate personal carry in objects; combination "hover" handle and no touch door latch; a toilet seat with improved durability; improved door hinge installation and performance; improved base fastener retention; an improved base; and high-lift bearing surface and relief.

5 Claims, 45 Drawing Sheets

(56) References Cited

U.S. PATENT DOCUMENTS

| | | | | |
|---|---|---|---|---|
| 5,603,184 | A * | 2/1997 | Campbell | E05B 15/10 292/145 |
| 5,619,826 | A * | 4/1997 | Wu | E04H 1/1216 52/35 |
| 5,682,622 | A * | 11/1997 | Tagg | E04H 1/1216 4/449 |
| 5,857,228 | A * | 1/1999 | Waltenberger | E03D 9/002 4/222 |
| 6,052,838 | A | 4/2000 | Thom et al. | |
| 6,115,971 | A * | 9/2000 | Loebertmann | E04H 1/1216 4/449 |
| 6,289,557 | B1 * | 9/2001 | Manson | E05B 1/0053 16/412 |
| 6,327,719 | B1 | 12/2001 | Lobertmann et al. | |
| 6,427,256 | B1 * | 8/2002 | Mullett | A47K 11/02 4/476 |
| 6,796,087 | B1 | 9/2004 | Greene | |
| 7,043,800 | B2 * | 5/2006 | Moody | E05B 53/001 16/412 |
| 7,975,325 | B2 * | 7/2011 | Holmstadt | E04H 1/1216 4/449 |
| 9,822,572 | B2 * | 11/2017 | Brown | E05F 11/54 |
| 2003/0121093 | A1 * | 7/2003 | Braxton | E04H 1/1216 4/476 |
| 2004/0010847 | A1 * | 1/2004 | Braxton | A47K 4/00 4/664 |
| 2004/0163335 | A1 * | 8/2004 | Hampel | E04H 1/1216 52/143 |
| 2005/0241055 | A1 * | 11/2005 | Mullett | E03D 5/01 4/476 |
| 2006/0260214 | A1 * | 11/2006 | Tagg | E04H 1/1216 52/79.1 |
| 2007/0129002 | A1 * | 6/2007 | Barrett | E04H 1/1216 454/343 |
| 2007/0256362 | A1 * | 11/2007 | Hansen | E05B 47/0046 49/32 |
| 2009/0100585 | A1 * | 4/2009 | Roberts | E03D 7/00 4/317 |
| 2009/0235445 | A1 * | 9/2009 | Goldstein | A47K 11/02 4/462 |
| 2010/0186162 | A1 * | 7/2010 | Leonard | E04H 1/1216 4/664 |
| 2010/0212082 | A1 * | 8/2010 | Tyler | E04H 1/1216 4/476 |
| 2011/0289671 | A1 * | 12/2011 | Westrick | A47K 11/02 4/476 |
| 2013/0118085 | A1 * | 5/2013 | Hedemark | E05F 11/54 49/356 |
| 2014/0143945 | A1 * | 5/2014 | Chen | E03D 7/00 4/321 |
| 2014/0197648 | A1 * | 7/2014 | Brown | E05F 11/54 292/336.3 |
| 2014/0325921 | A1 * | 11/2014 | Van Overbeek | E04B 1/343 52/79.5 |
| 2017/0181587 | A1 * | 6/2017 | McDonald | A47K 11/02 |
| 2017/0196418 | A1 * | 7/2017 | Ito | E04H 1/1216 |

* cited by examiner

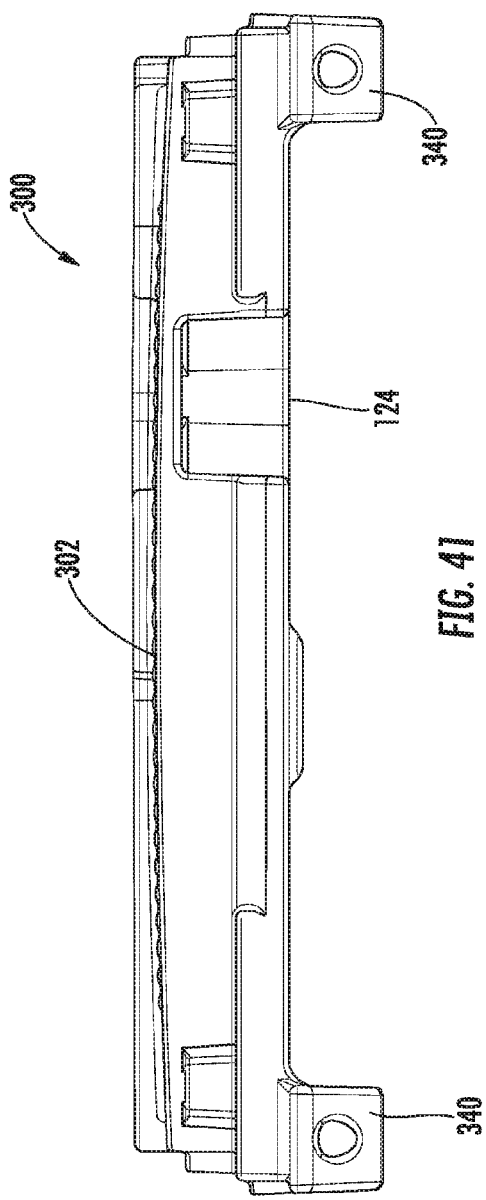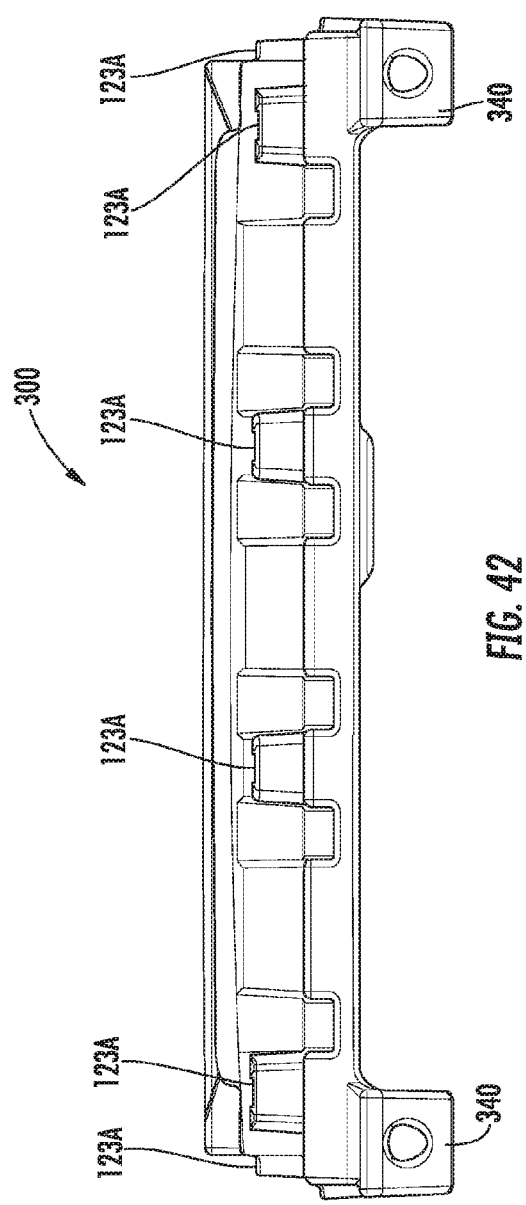

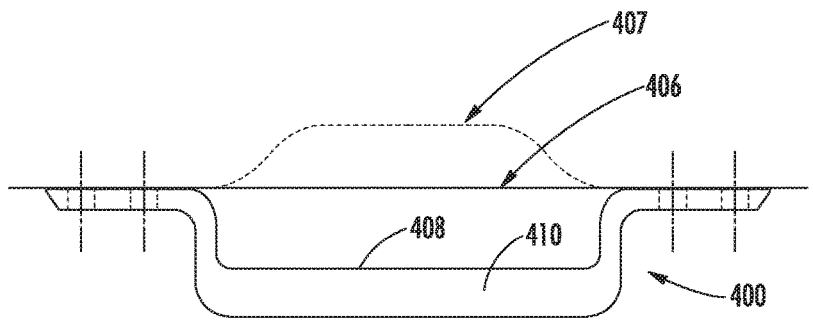
FIG. 48A
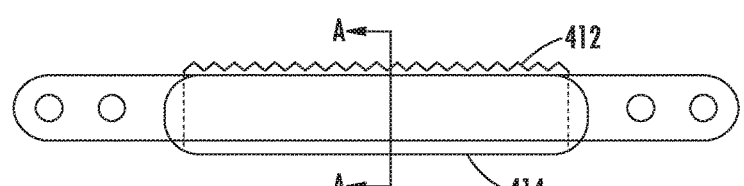 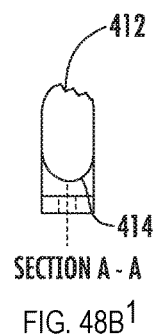
FIG. 48B    SECTION A - A
            FIG. 48B¹
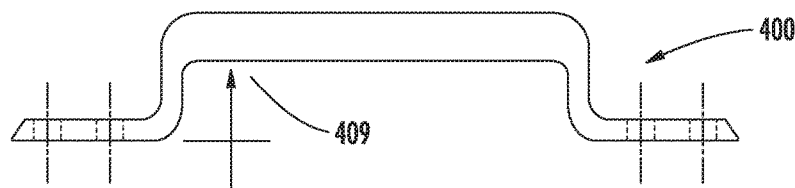
FIG. 48C
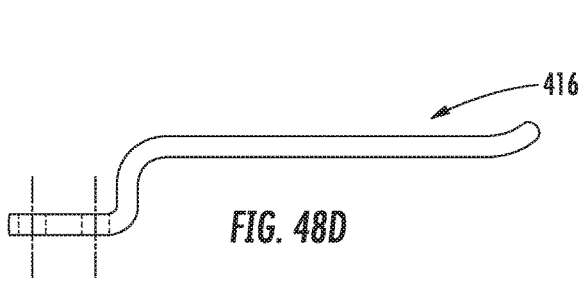 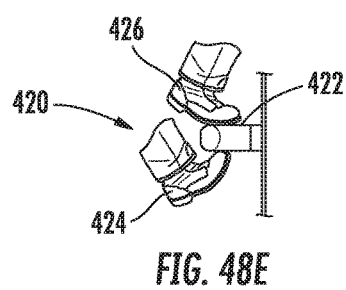
FIG. 48D    FIG. 48E

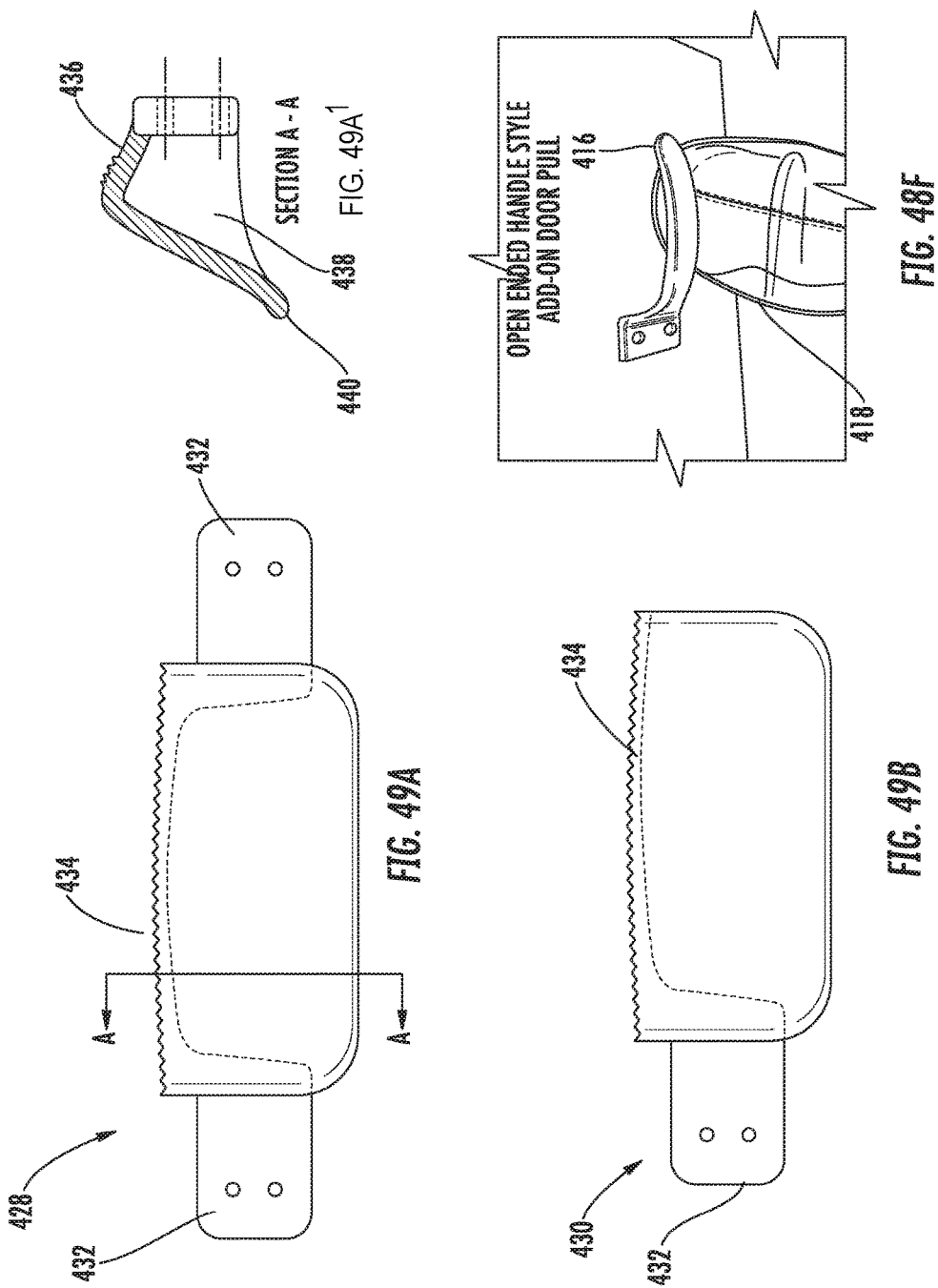

ELBOW OR KNEE OPERATED CUP STYLE
ADD-ON DOOR PULL

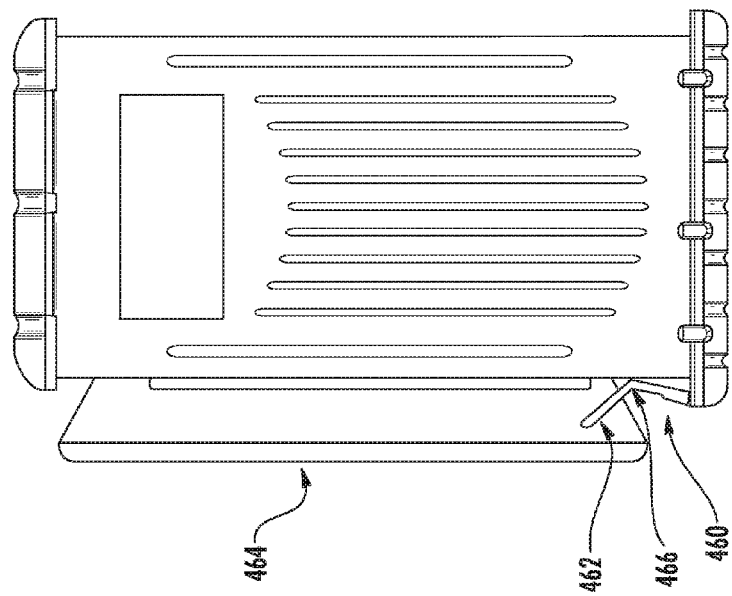
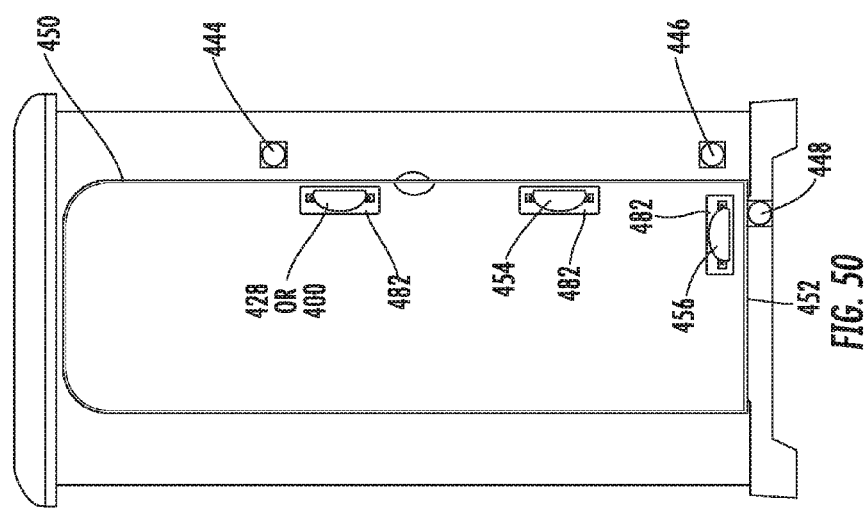

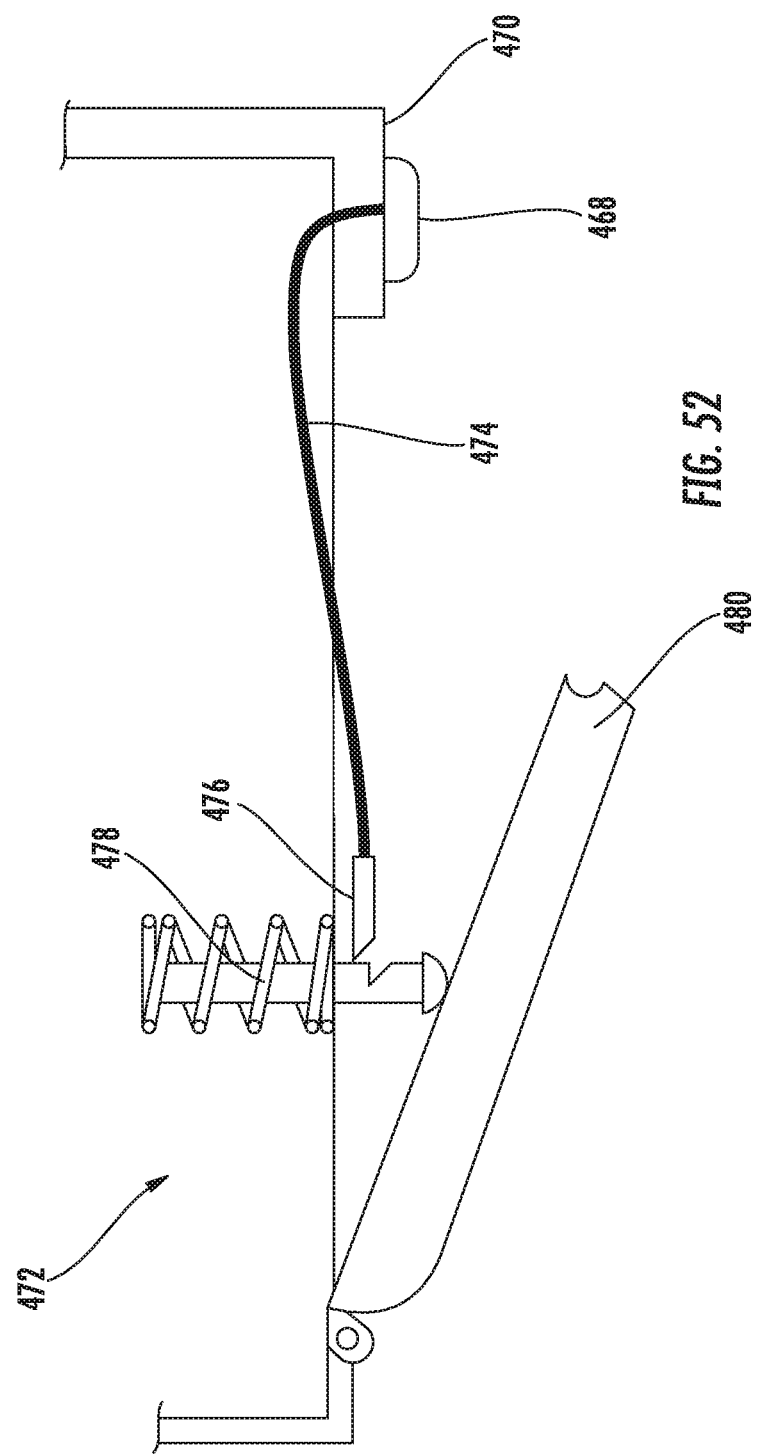

PORTABLE RESTROOM ASSEMBLY WITH HANDS-FREE DOOR OPENING SYSTEM

CROSS-REFERENCE TO RELATED APPLICATIONS

The present application claims priority to U.S. Provisional Patent Application No. 62/242,036 filed Oct. 15, 2015, entitled "Portable Restroom," and to U.S. Provisional Patent Application No. 62/291,256 filed Feb. 4, 2016, entitled "Portable Restroom," and to U.S. Provisional Patent Application No. 62/318,345 filed Apr. 5, 2016, entitled "Portable Restroom," the contents of each of which is incorporated herein by reference in its entirety.

FIELD

The present inventions relate to the field of portable restrooms. The present inventions more specifically relate to the field of improved construction of such portable restrooms.

BACKGROUND

Portable restrooms are generally composed of a portable enclosure containing a chemical toilet, and are typically used as a temporary toilet for construction sites, large gatherings, or as a cost-saving alternative to maintaining larger plumbing infrastructure, among other temporary needs. They are generally durable, constructed out of a lightweight molded plastic. Portable restrooms are typically large enough for only a single occupant. Some include both a seated toilet and urinal. Most include lockable doors and a means to vent the holding tank.

As indicated, portable restrooms are often designed for use by a single occupant. Moreover, portable restrooms offer limited interior space. Therefore, efforts are made in their design to optimize freedom of movement. Moreover, all the interior components must be cleaned and serviced regularly. Therefore, they must be easily accessible and cleanable. Items commonly found in portable restrooms are a shelf to place personal items (such as cell phones, camera, beverage can, etc.), a toilet paper dispenser, and/or a hook to hang a purse or belt or jacket.

One of the problems with portable restrooms is the noxious odor that exists due to waste which is kept in the restroom holding tank and chemicals used to break down the waste. Ventilation enhances user comfort in portable restrooms by minimizing these noxious odors. Ventilation can also help to reduce excessive (and potentially dangerous) heat resulting from solar gain. Current portable restrooms often include screens to assist in ventilation. In the absence of a portable restroom industry standard, manufactures have attempted to provide solutions which comply with screening perceptions associated with screened, well-fitting door and window openings found in modern homes and permanent public outdoor toilets, but at the same time resistant to damage and vandalism. Screen openings are typically produced as a relatively heavy plastic piece in a wide variety of geometries and sizes, as well as by various production methods; both as a separate component and/or integral part of the wall panel of the portable restroom. Unfortunately, none of these methods produce a screen with ventilation performance comparable to those commonly used domestically to prevent the entry of small insects and airborne debris. Additionally these manufactured screens suggest ample airflow by their many openings and/or size of openings. However, manufactured openings often produce abrupt and/or ragged edges that cause turbulence: an invisible restriction to optimum airflow. Furthermore, costly attempts to produce ventilation screens ignore the fact that portable restroom doors, due to the nature of their construction and placement of portable restrooms on, often, uneven surfaces, are not intended to replicate the fit of a modern domestic screened door; even having intentional gaps provided for drainage and/or airflow. Relative large openings to provide interior drainage are also commonly found about the bottom of the walls and tank. These relatively large openings associated with poorly fitting doors and drainage openings of a portable restroom negate the function of a screen intended to prevent the entrance of small insects and airborne debris. Ventilation in portable restrooms is further hampered with the often necessary practice of placing multiple units, side-by-side and/or back-to-back as large banks or a sitting of portable restrooms; with only the door fronts (which are typically unventilated) exposed to natural air movement. Accordingly, a need exists for improved ventilation of and improved airflow in a portable restroom.

Privacy in a portable restroom is typically provided by self-closing doors held shut by a closure device consisting of a spring and a polymer coated wire rope, serving as a lanyard with a loop on the jamb end. One end of the closure is attached to the door and the other end is attached to the hinge side door jam. As the door is opened the wire rope winds around component geometries which are typically weak and often abrupt, while at the same time tugs at the anchoring fastener in the jamb.

To afford users privacy, portable restrooms also use devices including a mechanism to lock or latch the door. Some of these systems are prone to breakage. Others use rotating devices which often mar the interior door surface. Some portable restrooms also use what is referred to as a "hover handle", which is a handle mounted to the interior panel of the door for the purpose of allowing the user to hold themselves over the tank opening while preventing contact with the toilet seat. Another problem with existing portable restrooms is they continue to require the user to touch various surfaces, such as the door handle or a portion of the door with their hand to enter or exit the portable restroom. "No touch" sanitary practices are becoming more commonplace. No touch normally refers to practices that avoid physical contact with or touching of potentially contaminated surfaces. Unfortunately, these practices have not been currently employed in portable restrooms. A need exists to integrate these devices to maximize space, reduce damage to the restroom, and to employ no touch sanitary practices.

A need also exists for improved hands-free door opening mechanisms in portable restrooms. Current portable restrooms offer foot operated door pulls which are integral shapes molded into the door and/or adjacent components at the time of manufacture. However, these systems operate poorly in the typical harsh outdoor and physical environment in which portable restrooms are used.

Another problem with portable restrooms is toilet seat breakage. The portable sanitation industry is aggravated by the high rate of toilet seat breakage. This breakage is attributed to the movement of a person positioned on the seat, causing rotational forces leading to the failure of the seat hinge components. Accordingly, an improved toilet seat for a portable restroom is needed.

As the term "portable restroom" implies, the portable restroom must be movable or transportable. However, the greatest stress on a portable restroom hinge joint fastener is when a unit is dropped on one of its front corners (typically when dropped from a transport vehicle) and when it is subjected to the stresses of a ratchet belt (during transport). In each case, the commonly used rivet and hinge leaf in a portable restroom door is subjected to significant stress and easily breaks. Likewise, fasteners that attach portable restroom sidewall components to the base often employ mechanical anchors, molded in plastic bosses or use threaded fasteners with no provision at all to enhance engagement. The mechanical anchors tend to be expensive and often rust over time. The molded-in bosses are relatively small in size and fasteners often miss them during installation, rendering them useless. Both the mechanical anchors and the molded-in bosses add significant cost the portable restroom base and provide questionable performance. Moreover, portable restrooms are often lifted by cranes to work areas not accessible to the usual servicing equipment. Lifting hardware used often includes cables or metal bars that engage the bottom of the portable restroom base by means of holes drilled through the vertical plastic walls of the base. The additional weight of the restroom holding tank fluids and handling stresses often cause the lift hardware to cut into the vertical wall of the base, weakening the base, and causing unsafe conditions. An additional safety concern is present when the lifting hardware used to cradle the portable restroom is allowed to hang in the area dedicated to ground handling equipment thus causing damage and safety concerns in an area difficult to observe.

In addition to the foregoing, portable toilets traditionally were formed having a support surface which spanned a hole in the ground. The toilet was then slid to a new location when the hole was filled. A subsequent iteration of a portable toilet included the addition of a tank, along with wooden runners for portability using lift trucks. This portable toilet continued to use a wooden support surface and wooden ribs to support the weight of the tank and occupant. The wooden support surface, wooden ribs, and runners were eventually replaced with plastic. This plastic part became a single molded plastic part or base, manufactured by a variety of processes from thermoforming to roto-molding, or blow molding, or injection molding, or compression molding. The base also became a reservoir used for flushing systems. However, to date, the rib structure on the base has not been adequate to effectively support the load of the portable toilet, the tank, and the occupant.

Accordingly, a need exists in the art for an improved portable restroom which provides solutions to the above-described drawbacks.

SUMMARY

Accordingly, an improved portable restroom is provided. The portable restroom offers features providing users with temporary toilet functions in a physically and emotionally secure environment while offering the owner/operator a cost-effective means of providing service. The portable restroom accomplishing the foregoing objectives includes the features of: improved ventilation; devices for no-touch sanitary safety practice; devices which facilitate personal carry in objects; combination "hover" handle and no touch door latch; a toilet seat with improved durability; improved door hinge installation and performance; improved base fastener retention; an improved base; and high-lift bearing surface and relief.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein:

FIG. 41 is a front elevation view of the base shown in FIG. 36.

FIG. 42 is a rear elevation view of the base shown in FIG. 36.

FIG. 48$a$ illustrates a top elevation view of one or more examples of a handle-style foot and elbow portable restroom door opener mounted on a door.

FIG. 48$b$ illustrates a side elevation view of one or more examples of a handle-style foot and elbow portable restroom door opener.

FIG. 48$b^1$ illustrates a cross-sectional view of the handle-style foot and elbow portable restroom door opener shown in FIG. 48$b$, taken from line A-A of FIG. 48$b$.

FIG. 48$c$ is a top elevation view of one or more examples of embodiments of a handle-style foot and elbow portable restroom door opener, showing clearance for a foot or elbow.

FIG. 48$d$ is a top elevation view of one or more examples of embodiments of a handle-style foot and elbow portable restroom door opener, showing an open end embodiment.

FIG. 48$e$ is a side elevation view of one or more examples of embodiments of a handle-style foot and elbow portable restroom door opener, showing a sole engagement and toe engagement area.

FIG. 48$f$ is an image of a handle-style door pull, showing the door pull in use, engaged by a foot.

FIG. 49$a^1$ is a cross-sectional view of the cup-style foot and elbow portable restroom door opener shown in FIG. 49$a$, taken from line A-A of FIG. 49$a$.

FIG. 49$b$ is a side elevation view of one or more examples of embodiments of a cup-style foot and elbow portable restroom door opener, showing an open end embodiment.

FIG. 49$c$ is an image of a cup-style door pull, showing the door pull in use, engaged by a foot.

FIG. 49$d$ is an image of an elbow or knee operated, cup style add-on door pull according to one or more examples of embodiments.

FIG. 50 is a front elevation view of a portable restroom having one or more examples of embodiments of hands-free door openers.

FIG. 51 is cut-away a side elevation view of a portable restroom having one or more examples of a hands-free door opener, showing an example of a pedal and lever door opener.

FIG. 52 is a cut-away partial top plan view of a portable restroom and door, having one or more examples of a hands-free door opener, showing an actuator assembly.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Figure 1:
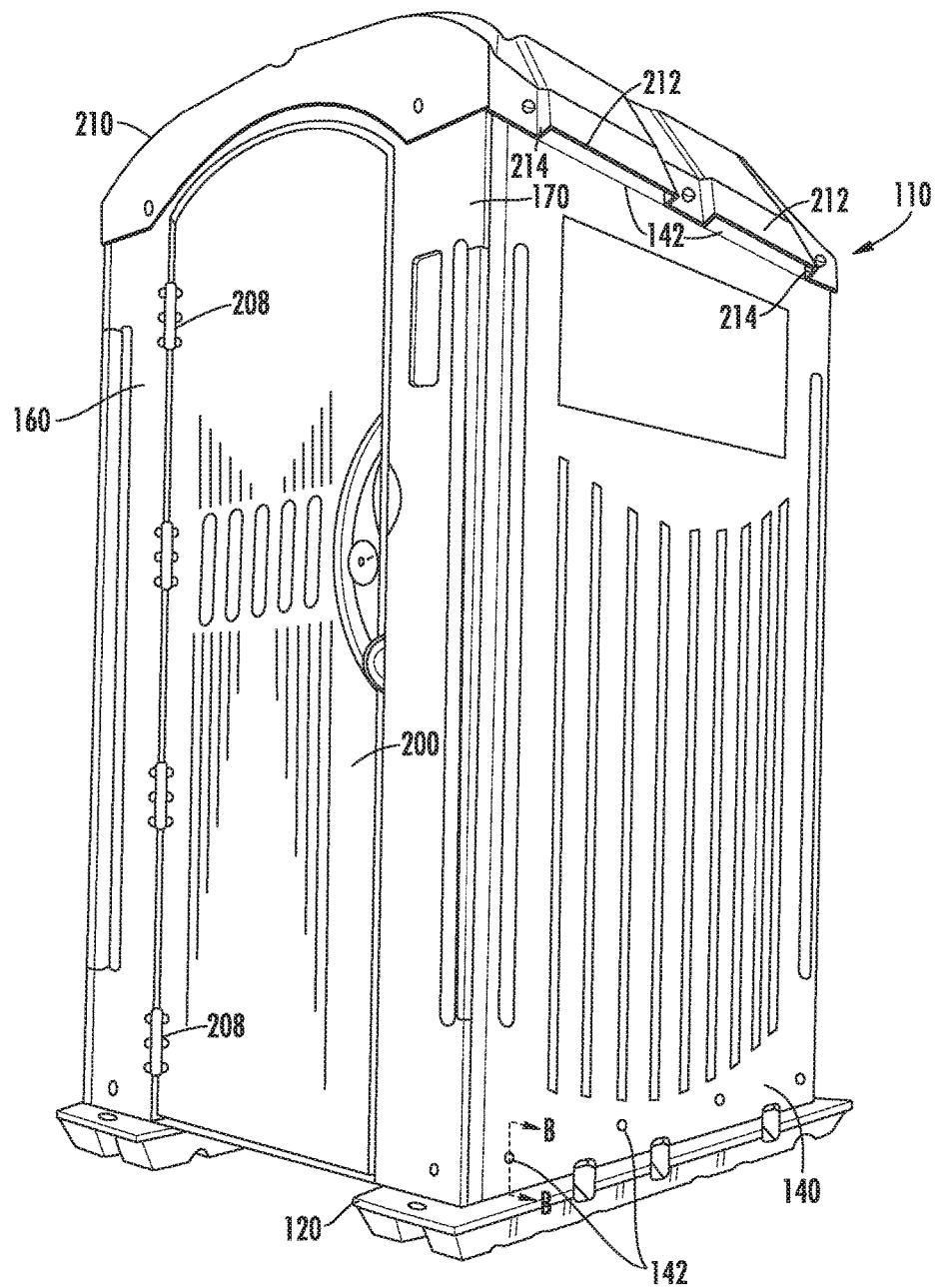
FIG. 1 illustrates a portable restroom according to one or more exemplary embodiments herein.
Figure 2:
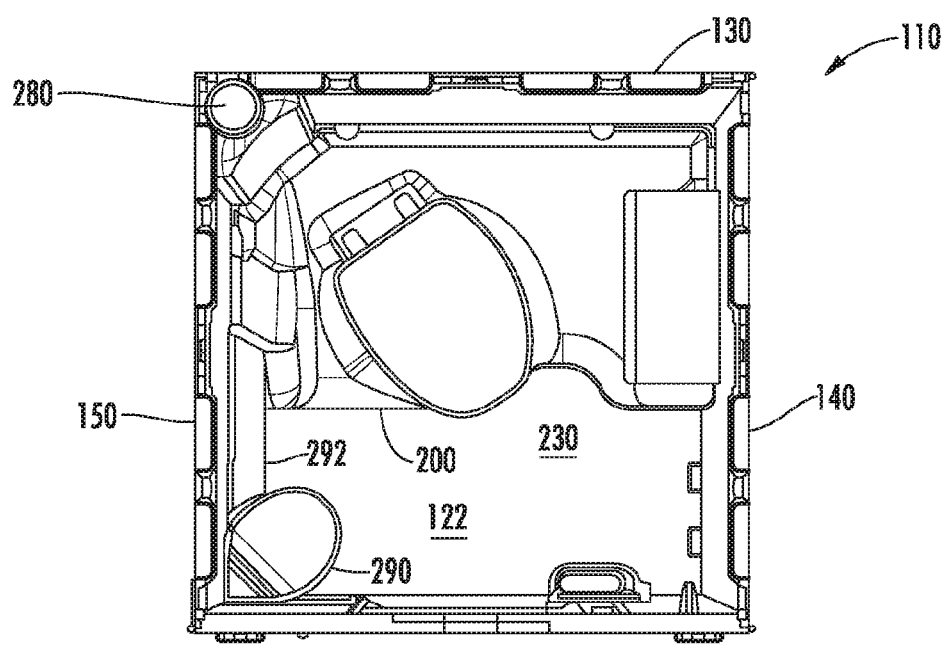
FIG. 2 illustrates a top interior floor plan view of the portable restroom of FIG. 1 with roof removed, according to one or more exemplary embodiments.

Referring to the Figures, an improved portable restroom is provided. The portable restroom, as shown in FIGS. 1-2, has one or more advantageous features which provide, for example, improved user experience and comfort as well as improved construction and durability. The portable restroom assembly 110 generally includes a base 120 having a floor portion 122, a rear wall 130, a left side wall 140 and a right side wall 150 which may be identical, a door jamb having a hinge side 160 and a latch side 170, a door 200, a vented roof 210, a toilet module 220 with a holding tank 130. The portable restroom assembly 110 may also include indicia on the door of the restroom or another surface of the restroom to inform and encourage users to open the door by inserting the toe of their shoes into the toe cavity behind the door portion with indicia to pull the door open from outside the portable restroom in a "no hand touch" manner. The portable restroom assembly 110 is generally constructed of polyethylene or other durable plastic. Advantageously, no rivets or fasteners are required to assemble the door sides or walls. The portable restroom assembly 110 offers features providing users with temporary toilet functions in a physically and emotionally secure environment while offering the owner/operator a cost-effective means of providing service. Referring to FIGS. 1 and 2, The portable restroom accomplishing the foregoing objectives includes the features of: (a) improved ventilation system; (b) devices for no-touch sanitary safety practice, such as a foot-pull; (c) devices which facilitate personal carry in objects, such as the improved shelf with integrated cup holder and strap retention nook; (d) combination hover handle door latch; (e) improved door hinge: (f) improved portability, installation and performance; (g) improved base fastener retention; (h) an improved base; and (i) improved high-lift bearing surface and relief; among additional features and devices described herein.

Referring to FIGS. 1-9, an improved ventilation system is provided. The improved ventilation system is facilitated by the roof/wall interface. In particular, optimum ventilation is achieved with the use of an unobstructed air shaft configured to resist the entrance of rain and configured to provide user privacy. The air shaft is also of maximum size afforded by the cross-section of the wall and/or roof components. The air shaft is optimally formed at the interface of the roof 210 and side walls 140 and 150 by opening specific sections of at least two walls, thereby forming one or more chamber(s) between the roof and walls. In other words, specific clearances or vent chambers 214 are defined between adjacent sections of the wall panels and roof by providing outwardly angled roof overhang portions 212 and inwardly angled side wall vent portions 142. The chamber(s) 214 are optimally formed by twin sheet thermoforming of the roof panel 210, and blow molding of the wall panels 142, although either molding method can be adapted to formation of either the roof or side walls. The interior surfaces, including walls, sides, and inside of the door may be smooth areas which permit easy cleaning. As a result of this improved ventilation system, the need for screens is reduced or eliminated. Moreover, the improved ventilation system permits the back-to-back or side-to-side alignment of multiple portable restrooms without sacrificing ventilation. Additionally, the blow molding or twin sheet thermoforming of wall panels provides increased durability.

Figure 3:
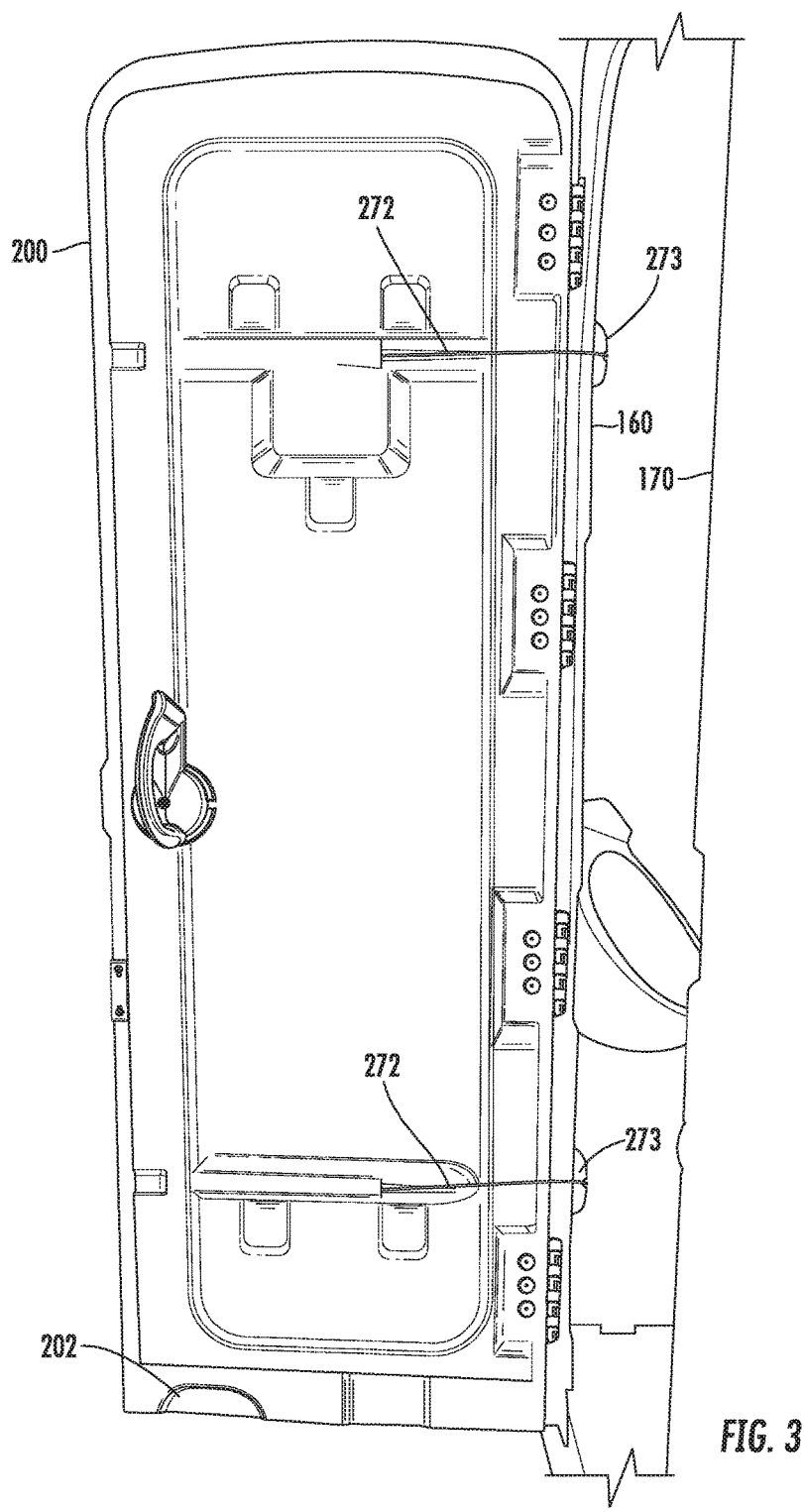
FIG. 3 illustrates a an elevation view of the inside surface of the attached door of a portable restroom as shown in FIG. 1 illustrating structure and attachments to the door according to one or more exemplary embodiments.
Figure 4:
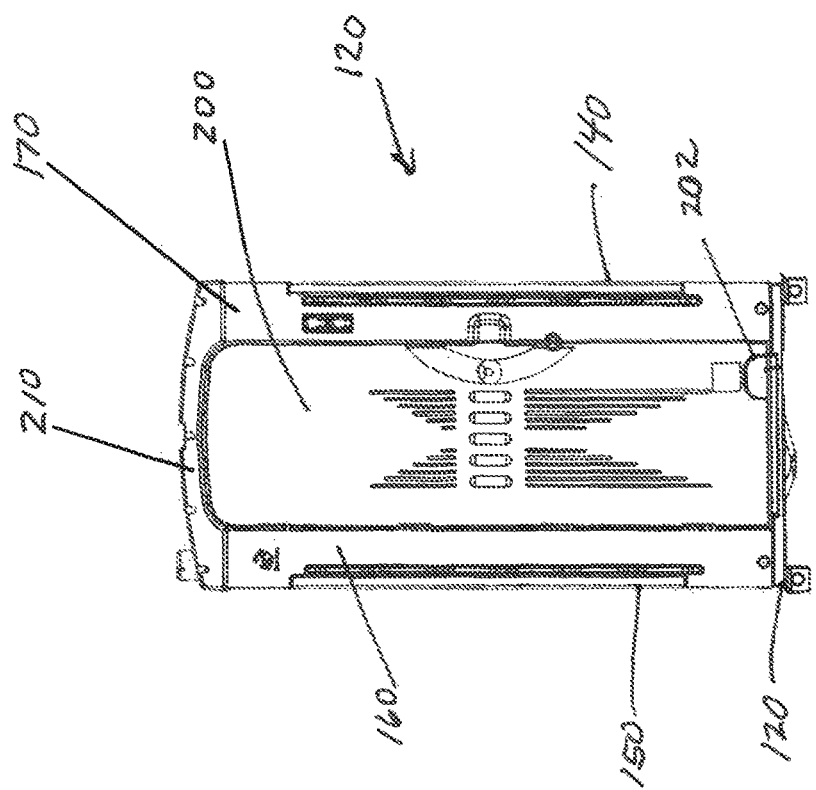
FIG. 4 illustrates a front elevation view of the portable restroom of FIG. 1 according to one or more exemplary embodiments.
Figure 5:
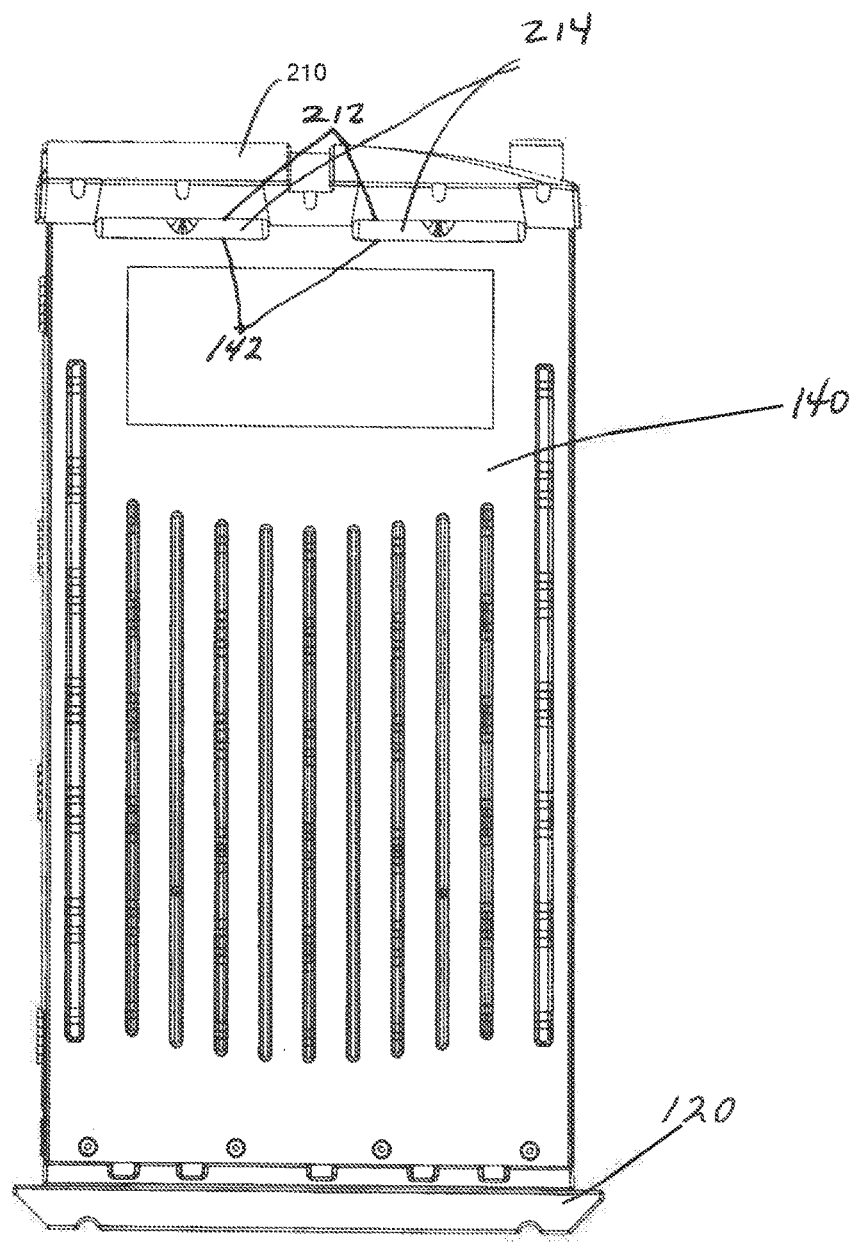
FIG. 5 illustrates a side elevation view of the portable restroom of FIG. 1 according to one or more exemplary embodiments.
Figure 6:
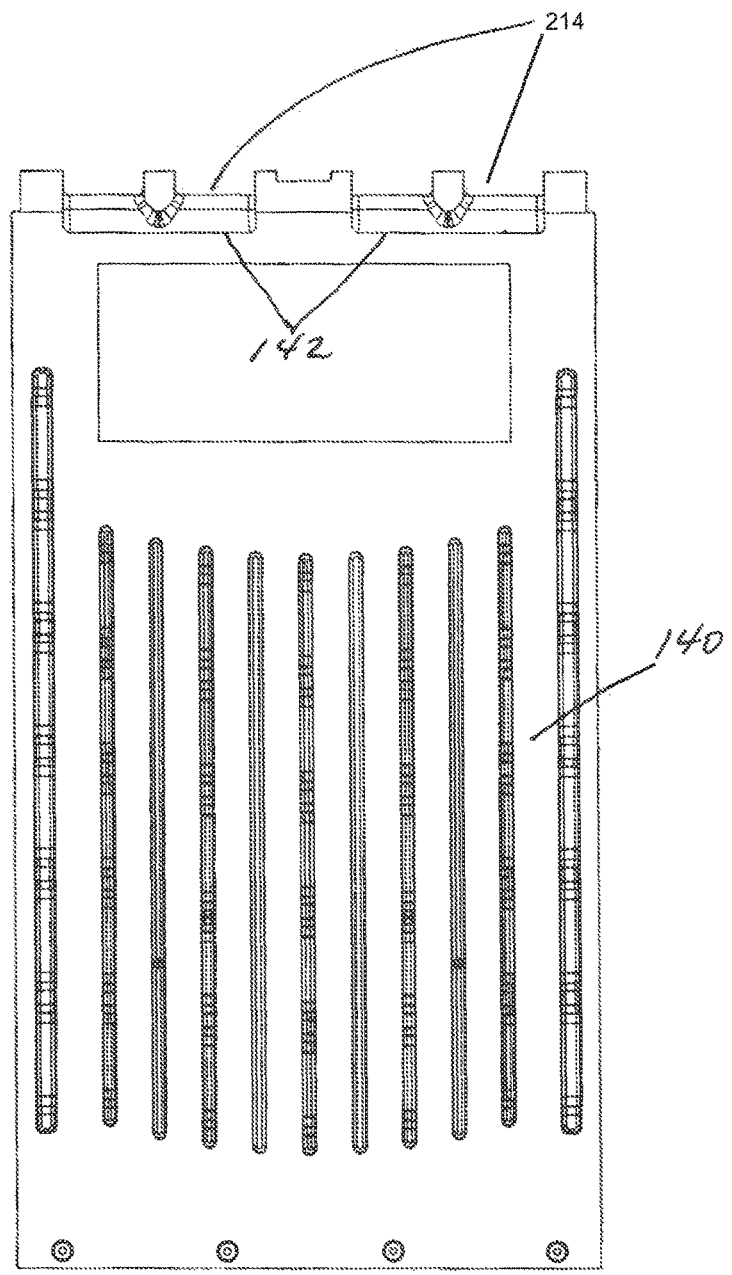
FIG. 6 illustrates an elevation view of a rear wall for use with the portable restroom of FIG. 1 according to one or more exemplary embodiments.
Figure 7:
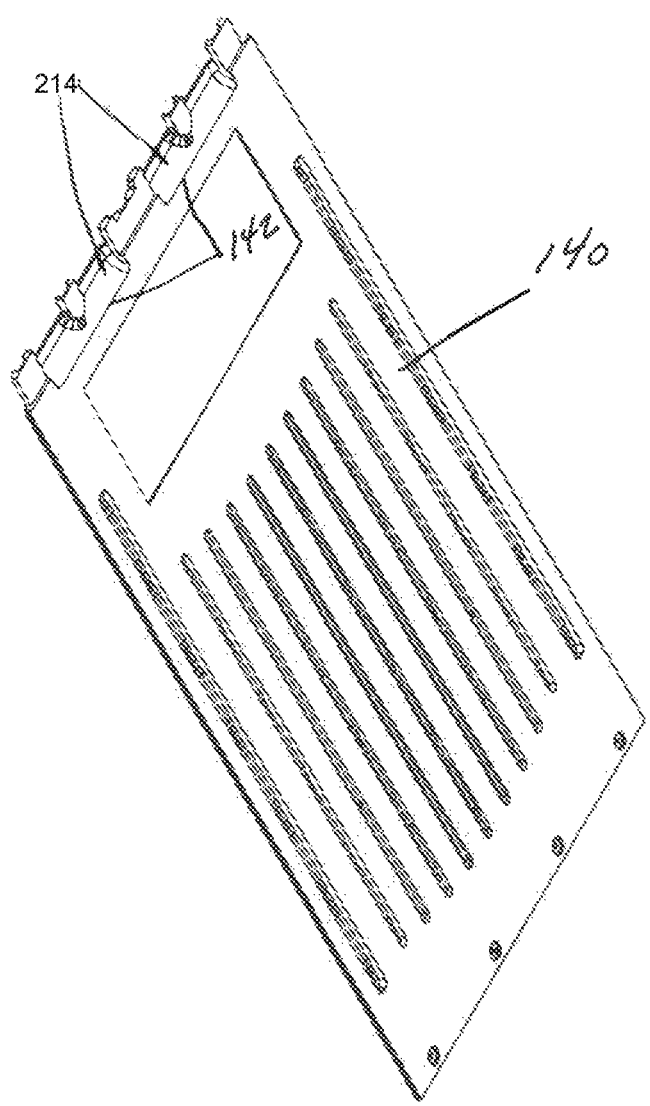
FIG. 7 illustrates a perspective view of the wall shown in FIG. 6 according to one or more exemplary embodiments.
Figure 8:
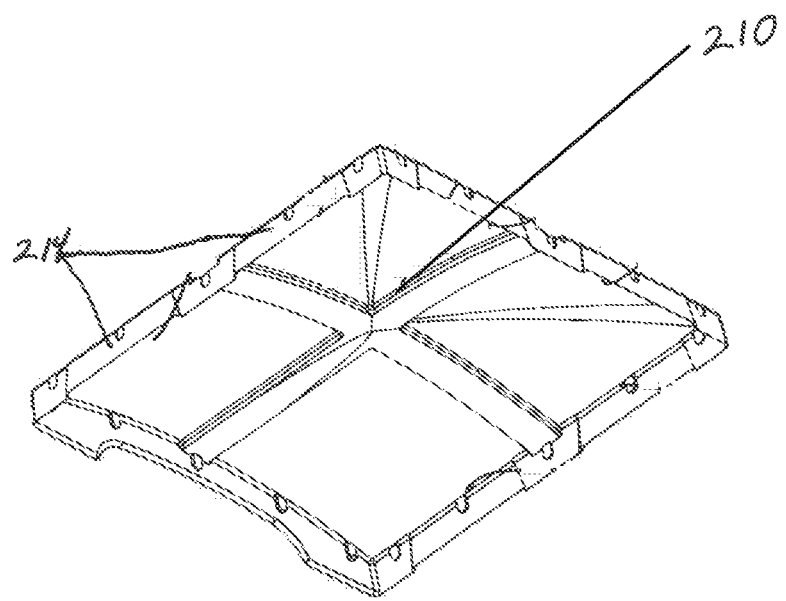
FIG. 8 illustrates a perspective view of the underside of a roof for use with the portable restroom of FIG. 1 according to one or more exemplary embodiments.
Figure 9:
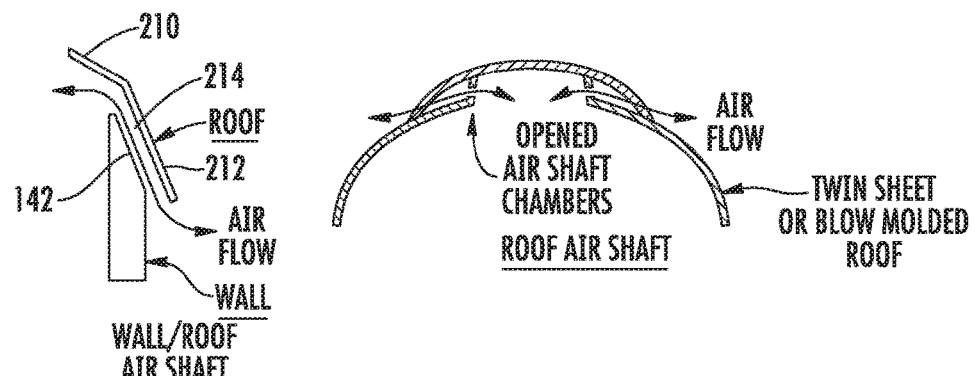
FIG. 9 illustrates cut away views of the roof and wall, showing an air shaft ventilation system for use with the portable restroom of FIG. 1 according to one or more examples of embodiments.
Figure 10:
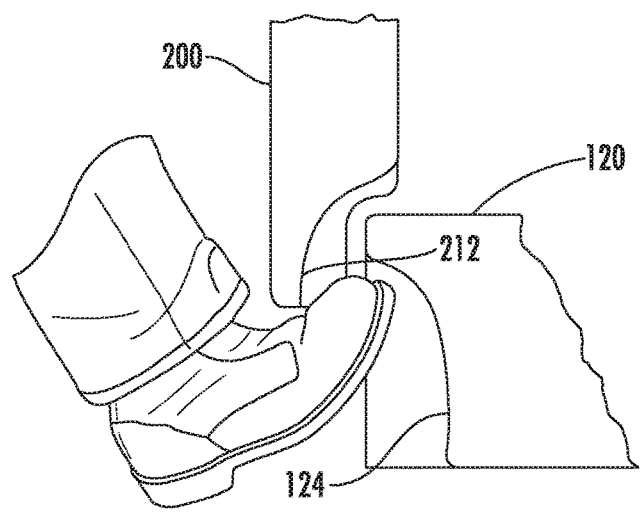
FIG. 10 illustrates a "no touch" door entry system for use with the portable restroom of FIGS. 1, 3 and 4, according to one or more exemplary embodiments.
Figure 11:
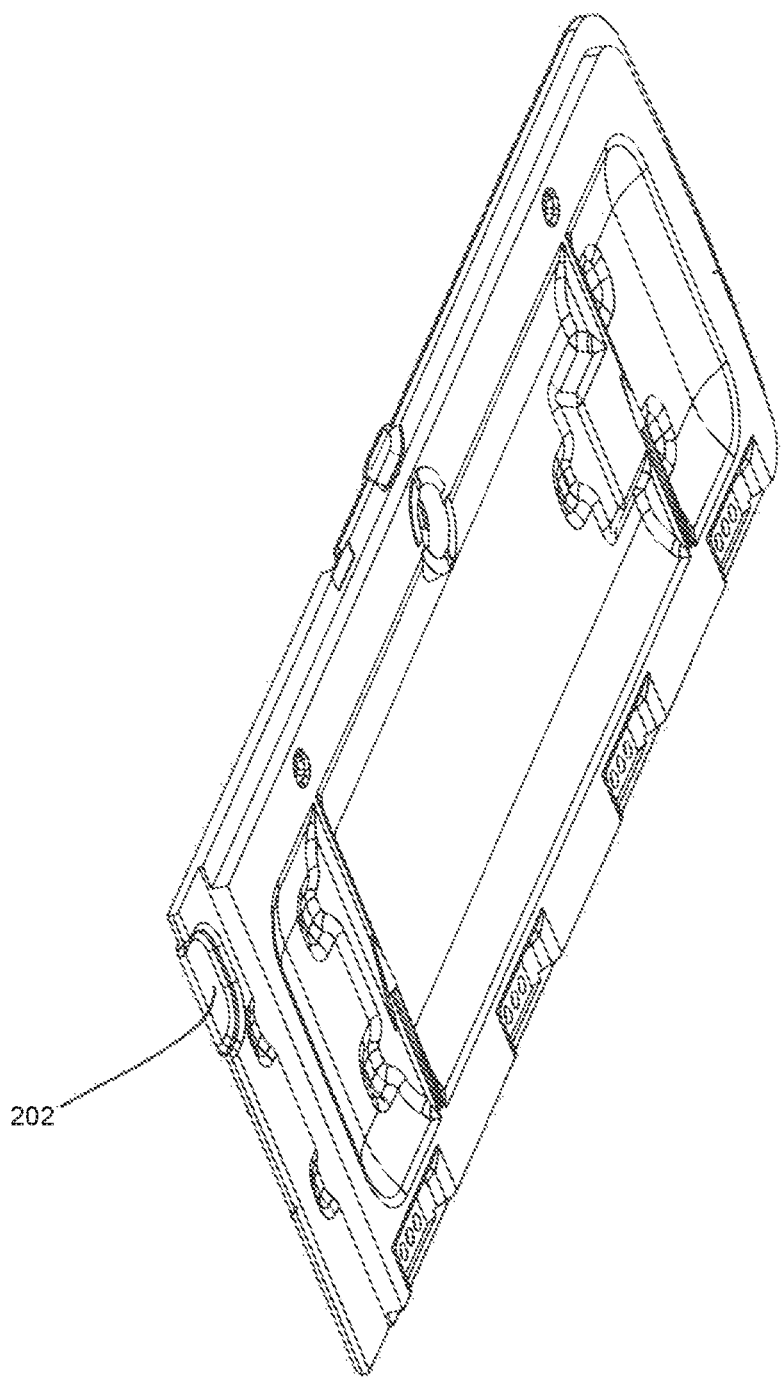
FIG. 11 illustrates a rear perspective view of a door for use with the portable restroom of FIG. 1 and having a recessed segment to facilitate the no touch door entry system of FIG. 10 according to one or more exemplary embodiments.
Figure 12:
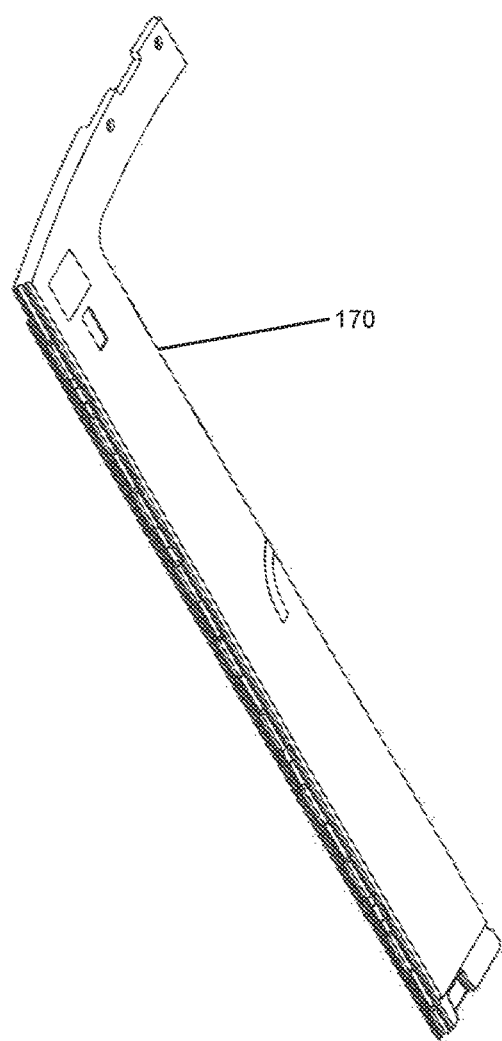
FIG. 12 illustrates a perspective view of a half of a door jamb for use with the portable restroom of FIG. 1 according to one or more exemplary embodiments.

In addition to ventilation, the portable restroom described herein also provides structural improvements which improve sanitary practices and user experience. FIGS. 1 & 10-12 illustrate exemplary embodiments of elements of a "no touch" door entry system. Unlike traditional interior doors, as found in a home or commercial buildings, portable restroom doors, and in particular the base of the door, are often raised from the floor/ground surface (see FIGS. 1 and 3). Accordingly, the no touch door entry system is provided to take advantage of this area of clearance. More specifically, the no touch feature is provided as a segment of clearance in the base and/or door. Referring to FIG. 3, the inside base of the door 200 may be optionally provided with generally recessed segment 202 on the interior bottom surface of the door forming a door relief or foot engagement section that extends from the base of the door. The base of the door, and/or at least a portion of the door relief segment, overlaps a portion of the portable restroom base. The portable restroom base may also be optionally provided with a base relief segment 124 aligned with the door relief segment 202. The base relief segment 124 is generally a recessed area on the base 120 providing clearance for a portion of a user's foot to toe. As a result of the opposed relief segments, clearance is available to engage the interior side of the door with the user's shoe toe to pull the door open and enter the portable restroom. The area of clearance or relief segment is provided either locally at the lower corner of the door opposite the hinge side and/or generally across the entire bottom of the door. Clearance may be provided either in the door or the base or both. As a result of the no touch door entry system, a sanitary environment is maintained and enhanced during entry into the portable restroom assembly 110.

Figure 13:
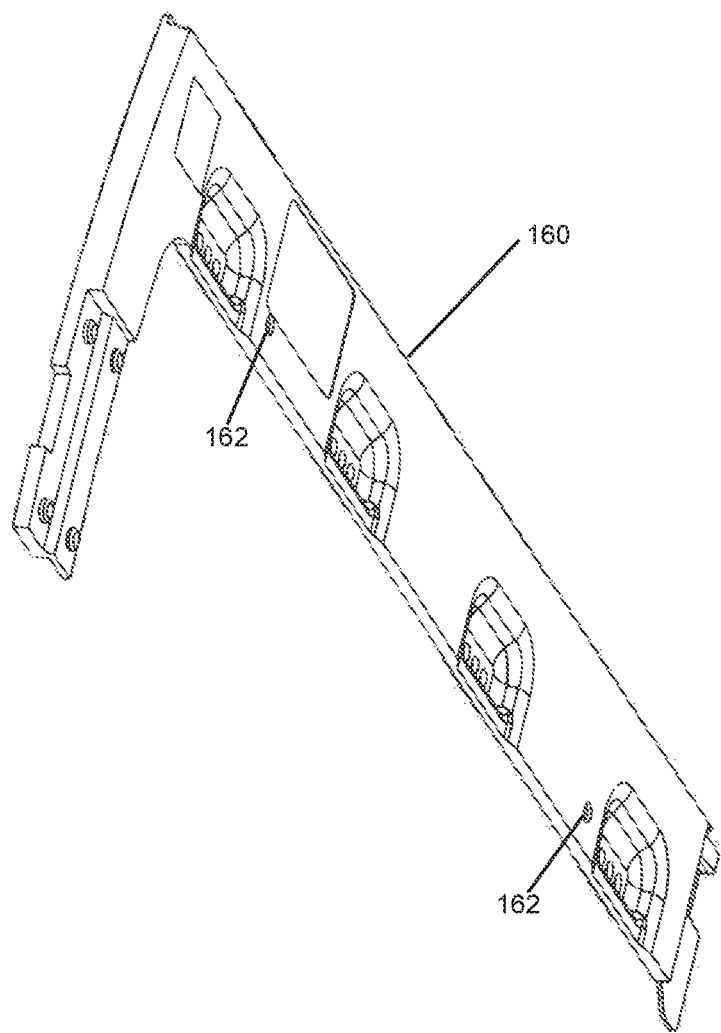
FIG. 13 illustrates a perspective view of an alternate half of a door jamb for use with the portable restroom of FIG. 1 according to one or more exemplary embodiments.
Figure 14:
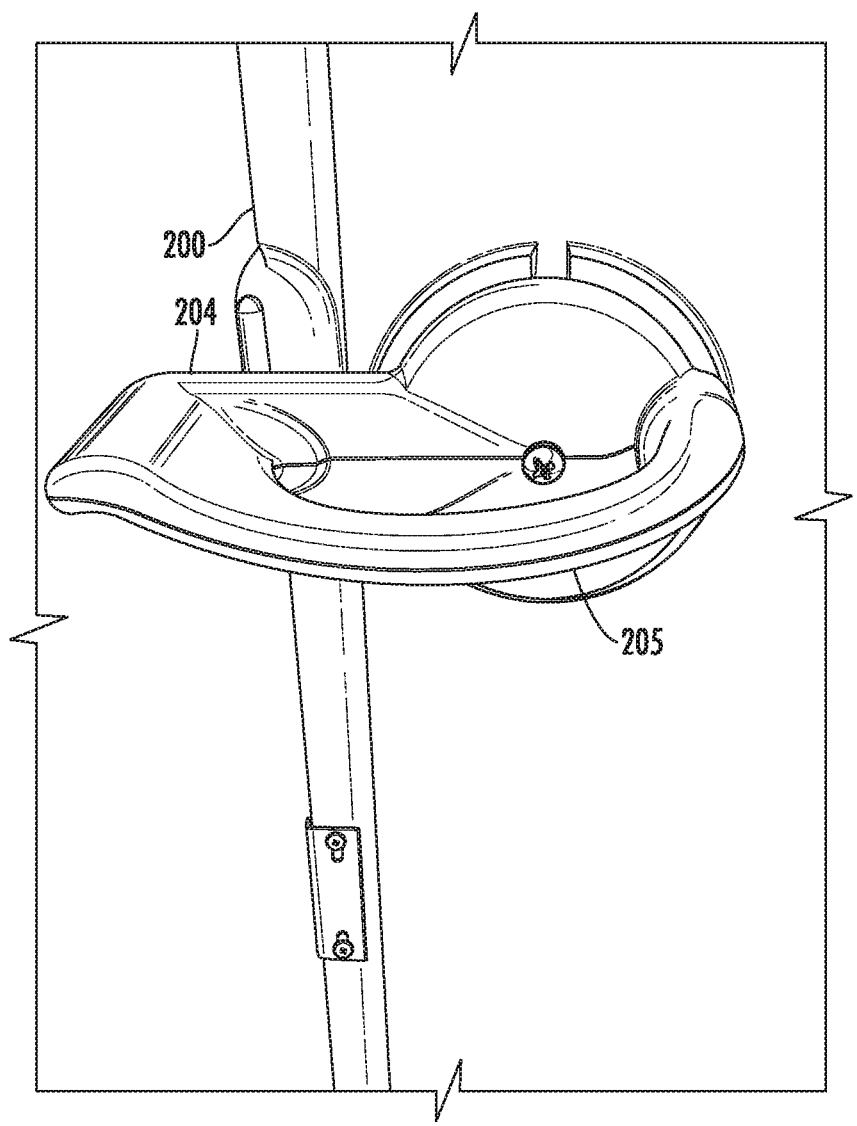
FIG. 14 illustrates a front elevation view of a "no touch" hover handle door latch for use with the portable restroom of FIG. 1 according to one or more exemplary embodiments.
Figure 15:
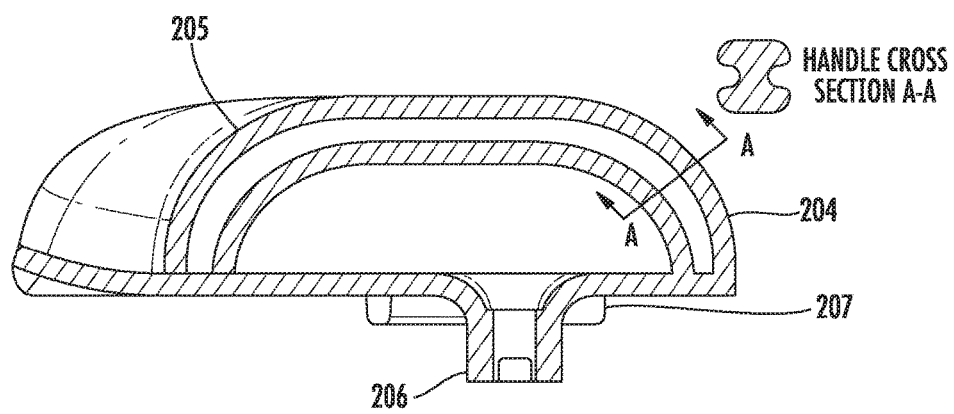
FIG. 15 illustrates a partial cross-sectional view of a "no touch" hover handle door latch according to one or more exemplary embodiments.
Figure 16:
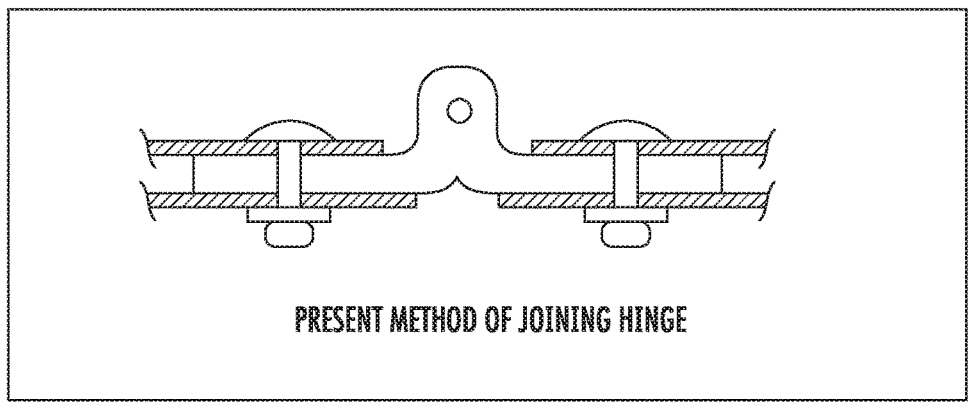
FIG. 16 is a partial cross sectional view which illustrates an example of a prior art method of joining a hinge to a door and a wall of a portable restroom.

An improved handle is provided on the door of the portable restroom on the interior surface. Like the no touch door entry system, the improved handle facilitates a no touch door exit. More specifically, FIGS. 1, 13-14 illustrate a no touch hover handle door latch 204. In particular, the handle may be operated by means other than the user's hands. However, the door handle also includes a hover handle hold which is an outwardly curved handle bar 205 that is attached on both ends to a handle base. A user may grip and support oneself above and in spaced relation to the toilet seat using the handle bar 205 in the manner described herein. The contours of the handle bar 205 can be seen in FIG. 14. Alternatively, the handle bar 205 can be formed with an I-beam type configuration for improved strength as shown in cross-section "AA" of FIG. 15. The handle base, at its distal end, is ramped to engage the inside surface of a door jamb and secure the door in closed position. This is shown in the embodiment of FIG. 15. The handle base may also be upwardly curved at its distal end to engage the elbow or forearm of a user. As a result, a user may operate the handle without the use of his or her hands. The handle base is joined to a stem 206 with locator notch which extends through the door 200. A conventional occupancy indicator (not shown) may be provided on the stem and facing the exterior. A rotation stop 207 and door resistance may also be provided to control or restrict movement of the handle. The handle 204 is constructed of a durable, strong, rigid material, such as a durable plastic or polymer. The handle combines the function of a "hover handle" and the reliability of a rotating type door latch with an ergonomic shape operable with the forearm or elbow. In addition the handle provides a minimum resistance to rotation and a locked position occurs in an area that prevents any visible marring or disfiguration to the door.

Figure 17:
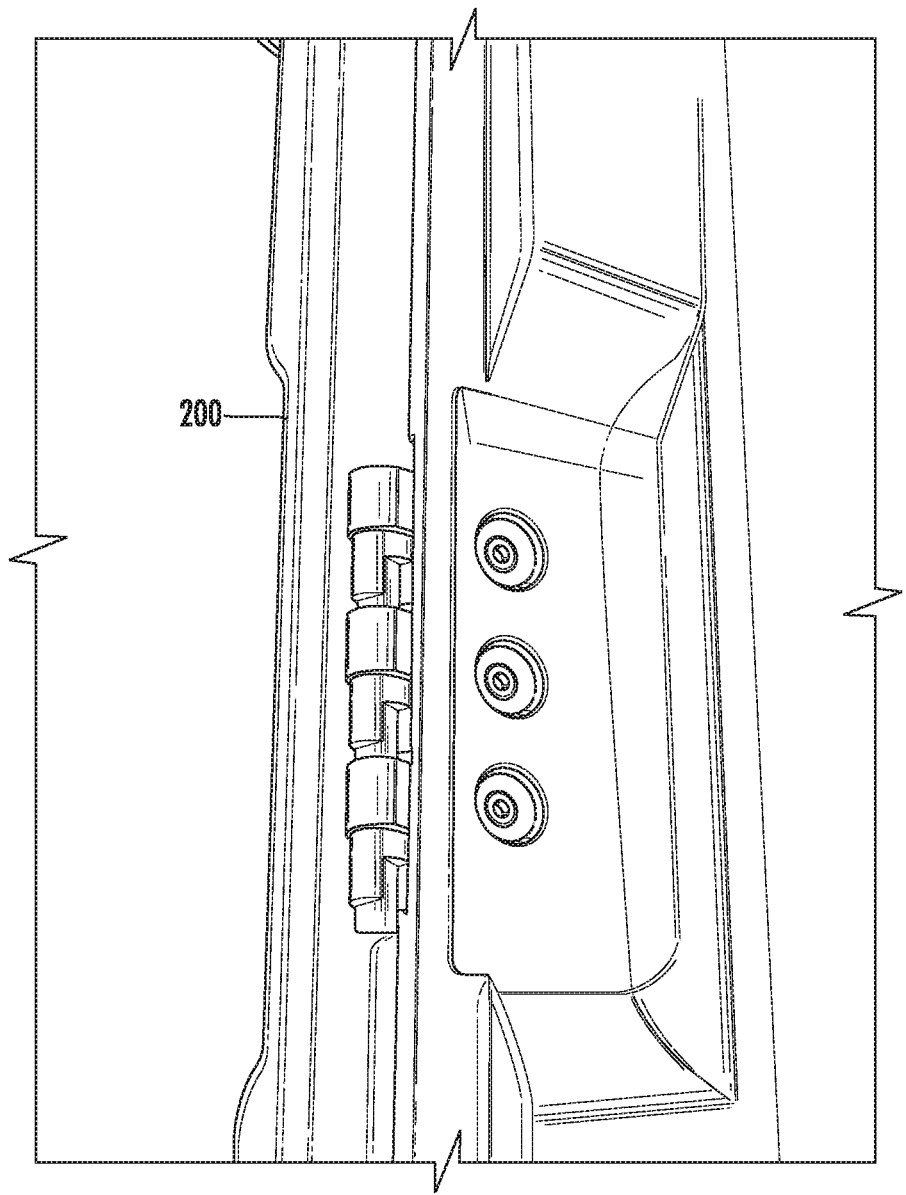
FIG. 17 illustrates one or more examples of a hinge pocket with bosses for use with the portable restroom of FIG. 1 according to one or more exemplary embodiments.
Figure 18:
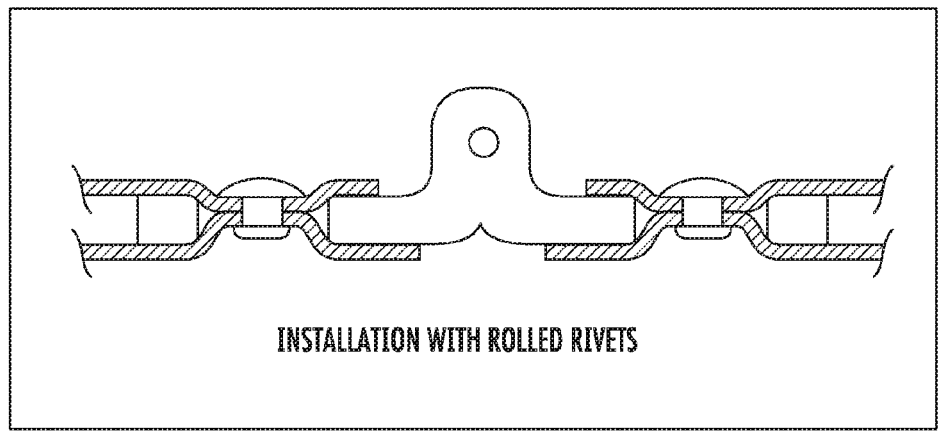
FIG. 18 is a partial cross-sectional view which illustrates an installation of a poly boss hinge with rolled rivets for joining a door and a wall for use with the portable restroom of FIG. 1 according to one or more exemplary embodiments.
Figure 19:
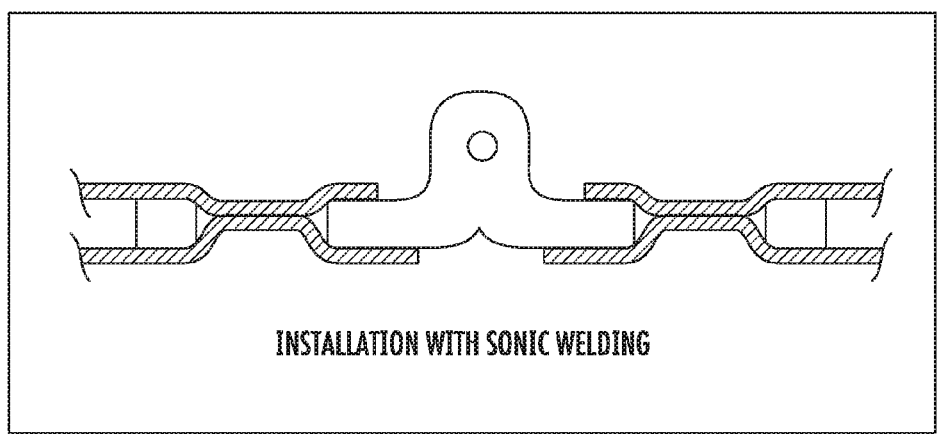
FIG. 19 is a partial cross-sectional view which illustrates one or more alternative examples of embodiments of an installation of a poly boss hinge with sonic welding for use with the portable restroom of FIG. 1.
Figure 20:
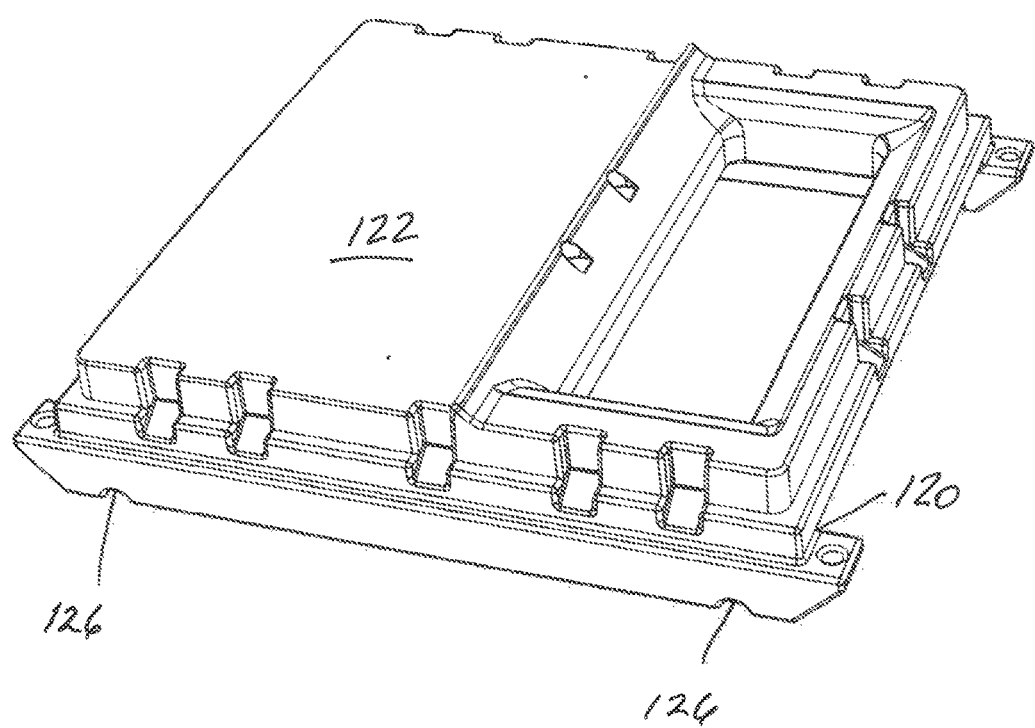
FIG. 20 illustrates a perspective view of a base for use with the portable restroom of FIG. 1 according to one or more exemplary embodiments.

The door of the portable restroom is subject to heavy use, constantly opening and closing, and as a result is subject to break over time. Accordingly, in addition to a durable handle as described above, durable hinges are necessary to prolong the life of the portable restroom. As shown in FIGS. 1, 16-18, four high density polyethylene hinges 208 are provided. This high density polyethylene hinges are durable in use with the portable restroom. Each hinge has a plurality of leafs. The hinge leafs alternatively join the hinge to the door 200 and to the hinge side door jamb 160. Traditionally, hinge leafs are clamped in a pocket formed between the flat inner and outer sheets of the door and jamb with conventional pop rivets and a backup washer (see FIG. 16). This is a dependable but antiquated and labor intensive process. For example, pop rivet installation requires the use of predrilled holes and requires that the hinge axis be carefully aligned. This assembly is typically accomplished with an elaborate drill fixture incorporating multiple headed drills (one for each hinge leaf) and is used for both the door and the jamb. As a result, the cost of the drill fixture and labor is also quite high. As alluded to above, the normal use of the door places a shear load on the plastic. This load is proportional to the diameter of the rivet. Accordingly, as shown in FIGS. 17-19, bosses are added to the door and jamb, forming a poly-boss hinge assembly. A boss is generally a knob, stud, or other circular rounded protuberance or an area of increased thickness, usually cylindrical, that strengthens around a hole. Adding bosses to the door and jamb sheets that engage the hinge leaf reduces the required clamping force by shifting stresses from the fastener (e.g., rivet) to the more ductile plastic boss. In one or more examples of embodiments, the hinge leaves snap into place over the bosses and are thereby self-aligning. The poly-boss hinge assembly allows the use of traditional pop rivets, but the requirements for the fastener joint are reduced and thereby less labor intensive and more technology intensive. In one or more alterative embodiments, instead of pop rivets, self-piercing rolled rivets or sonic welding may be used (see FIGS. 17-18). In addition to the advantages set forth above, the poly-boss hinge assembly eliminates the need to drill 24 holes and the labor of handling a 24 pop rivets, a rivet gun and blind positioning of a washer.

Figure 21:
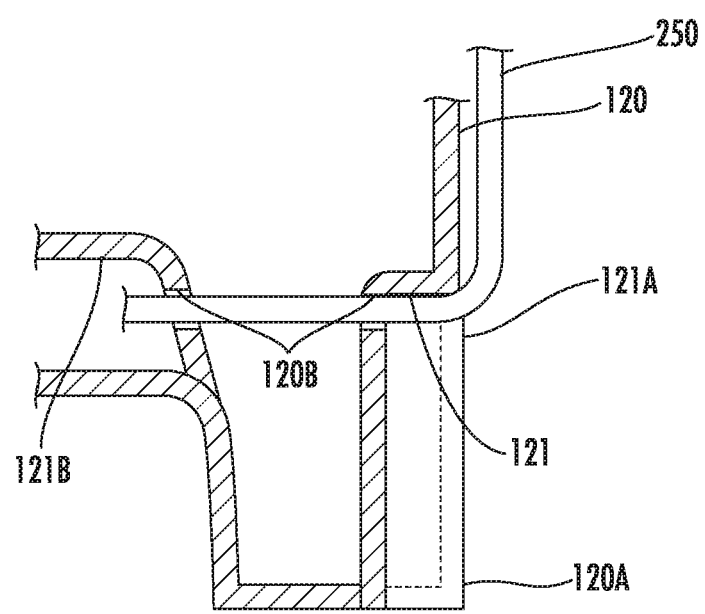
FIG. 21 illustrates a cut away cross-sectional view of a high-lift bearing for use with the portable restroom of FIG. 1 and base of FIG. 24 according to one or more exemplary embodiments.
Figure 24:
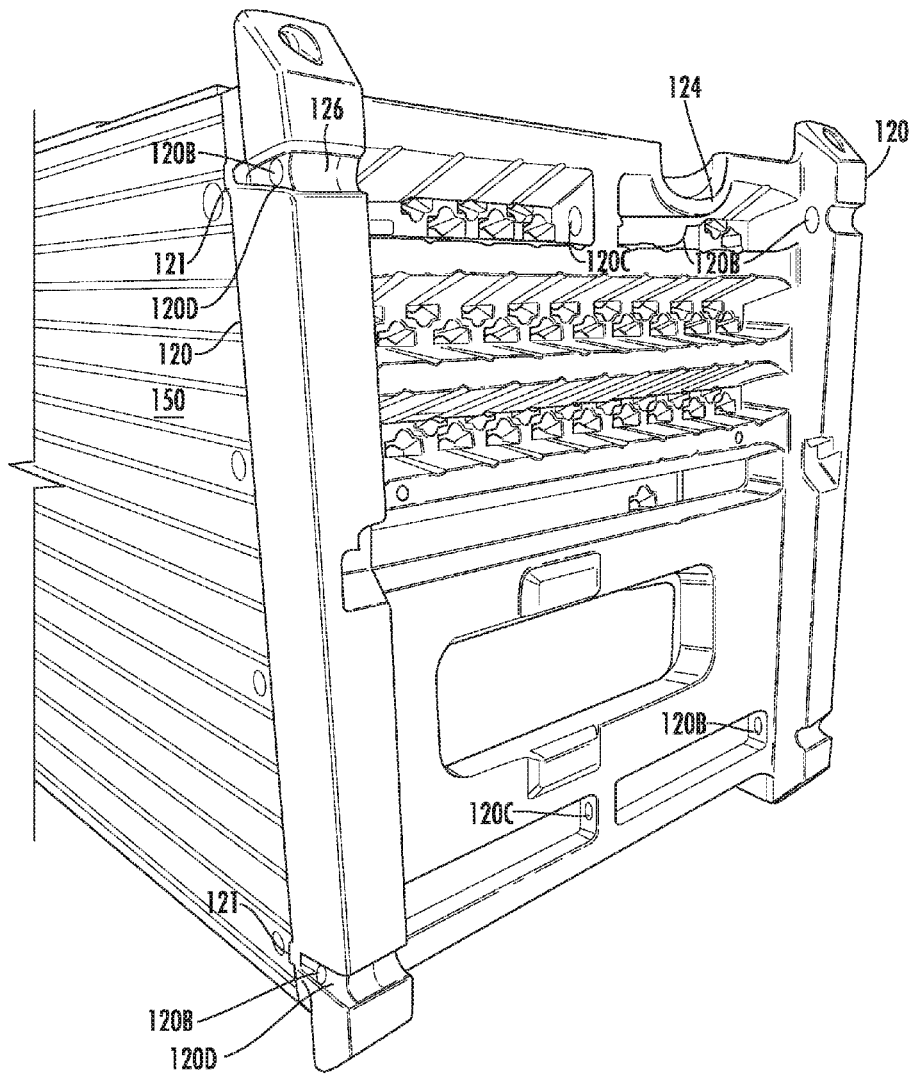
FIG. 24 is a perspective view of the bottom of a base for use with the portable restroom of FIG. 1 and base of FIG. 20 illustrating the undersides of two sets of two aligned high-lift bearings, as further shown in FIG. 21, for accommodating a pair of flexible cables or brackets (not shown) each extending beneath and within aligned bearings for the purpose of lifting the portable restroom for transport between storage and elevated locations.

In addition to the door, the base 120 of the portable restroom assembly 110 is designed to withstand the movement of the restroom and its placement on high rise construction locations. In this regard, the base 120 of the restroom has an improved construction designed to improve durability during transport and use site installation. FIGS. 21 and 24 illustrate high-lift bearings according to one or more examples of embodiments. High-lift bearings, or horizontal bearing areas 121, as shown, are areas molded in the portable restroom base of FIG. 24 that provide additional support proximate to the base vertical wall during lifting. The horizontal bearing area 121 is provided in an area that reduces the stress on the vertical sidewall(s) 121A, thus preventing damage that destabilizes the unit when lifted with a crane. As can be seen lifting hardware such as cable 250 or steel bars (not shown) engages a horizontal bearing area 121 provided in the base. Referring to FIG. 21, this horizontal bearing area engages the lifting hardware or cable 250 rather than the relatively narrow thickness of the restroom base vertical wall. Protective grooves 121B are also provided in the base. The protective grooves 121B eliminate the problem of lift hardware 250 coming into contact with ground handling equipment. Referring to FIG. 24, which is a perspective view of the side and bottom of the base 120 and sidewall 150 attached thereto, when the base is adapted for crane lifting utilizing known sling systems, holes 120B are drilled in vertical walls of the runners 120A which extend along each of the lower sides of the base 120. The upper circumferences of the holes are aligned with or slightly above the bearing surface of the horizontal bearing area 121 to insure that the particular lifting hardware which is to be utilized will be lifting primarily against the horizontal bearing area 121, with minimal pressure on the upper circumferences of the holes 120B which function primarily to position the cables 250 or other lifting hardware within the base at a level above the lower surfaces of the base extending between the runners 120A which are primarily accessed by forklift equipment for land transport and truck loading. In addition, holes 120C are located in vertical walls of the base between the runners 120A, as shown in FIG. 24, which are aligned with the runner holes 120B to maintain the lifting cables 250 or other hardware in alignment across the full width of the base 120. As shown, the exterior vertical walls of the runners 120A are indented by the length of the horizontal bearing areas 121, which indention 120D extends to the conventional axle bearing surfaces 126 for wheel and axle assemblies (not shown) commonly used to move and position portable restrooms around building job sites.

Figure 22:
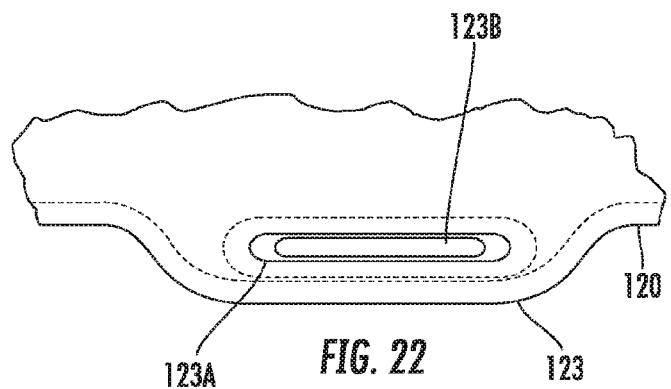
FIG. 22 illustrates a triple-wall pocket fastening system for use with the base of FIG. 24 and portable restroom of FIG. 1 according to one or more exemplary embodiments.
Figure 23:
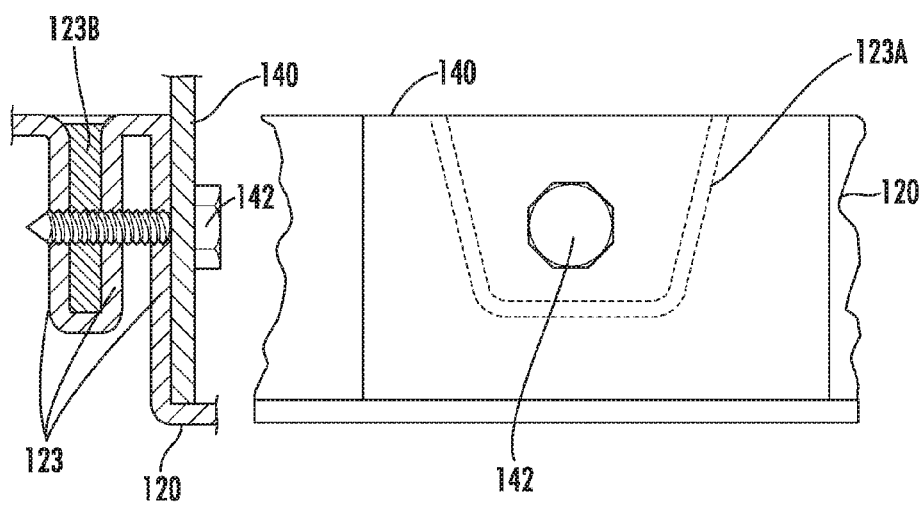
FIG. 23 illustrates an alternative cross-section view taken along Section Line B-B of FIG. 1, and along Section Line B-B of the side view of FIG. 23, showing both of the alternate triple-wall pocket fastening system and fastener therein of FIGS. 1 and 22 for use with the portable restroom assembly according to one or more exemplary embodiments.

The base 120 of the portable restroom is formed and separately assembled to the walls of the restroom 110. In this regard, a durable and strong attachment is often desired, particularly because the portable restroom is intended to be moved. Referring to FIG. 1 and FIGS. 22-23, a triple-wall pocket fastening system is used to assemble the base to the walls in the portable restroom described herein. FIGS. 22-23 illustrate the triple-wall pocket fastening system of the base 120. As shown in the Figures, the base triple wall 123 is formed having at least two folds so as to overlap and form three approximately parallel walls. The triple wall 123 may extend along the horizontal length of the base 120 or may be provided in specific pocket locations. As illustrated, the adjacent wall portions of the triple wall 123 are also spaced apart. Between at least one pair of adjacent walls of the triple wall is a pocket 123A formed by the spaced apart walls (See FIGS. 21-22). An insert 123B may be positioned within the pocket. The insert 123B may be an additional plastic or metal piece formed to fit within the pocket. Alternative materials may also be acceptable. A fastener 142 may be inserted through the three walls and insert. Advantageously, the triple-wall 123 pocket system presents three wall thickness of material as well as an additional plastic or metal insert over a relatively large area (compared to other fastening methods) so as to optimize the fastener's clamping and retention forces with significantly lower costs.

Figure 25:
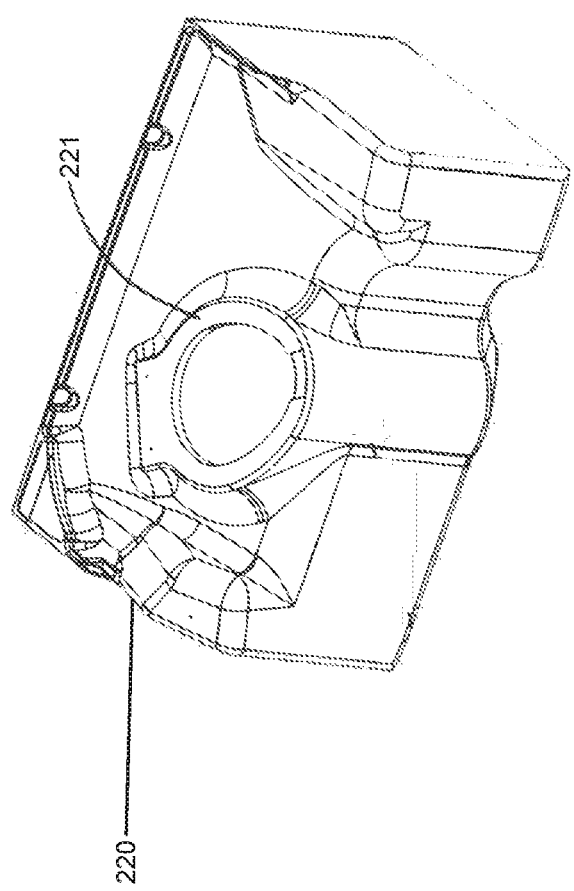
FIG. 25 illustrates a perspective view of the toilet seat and tank unit illustrated in FIG. 2, without the toilet seat lid, according to one or more exemplary embodiments.
Figure 26:
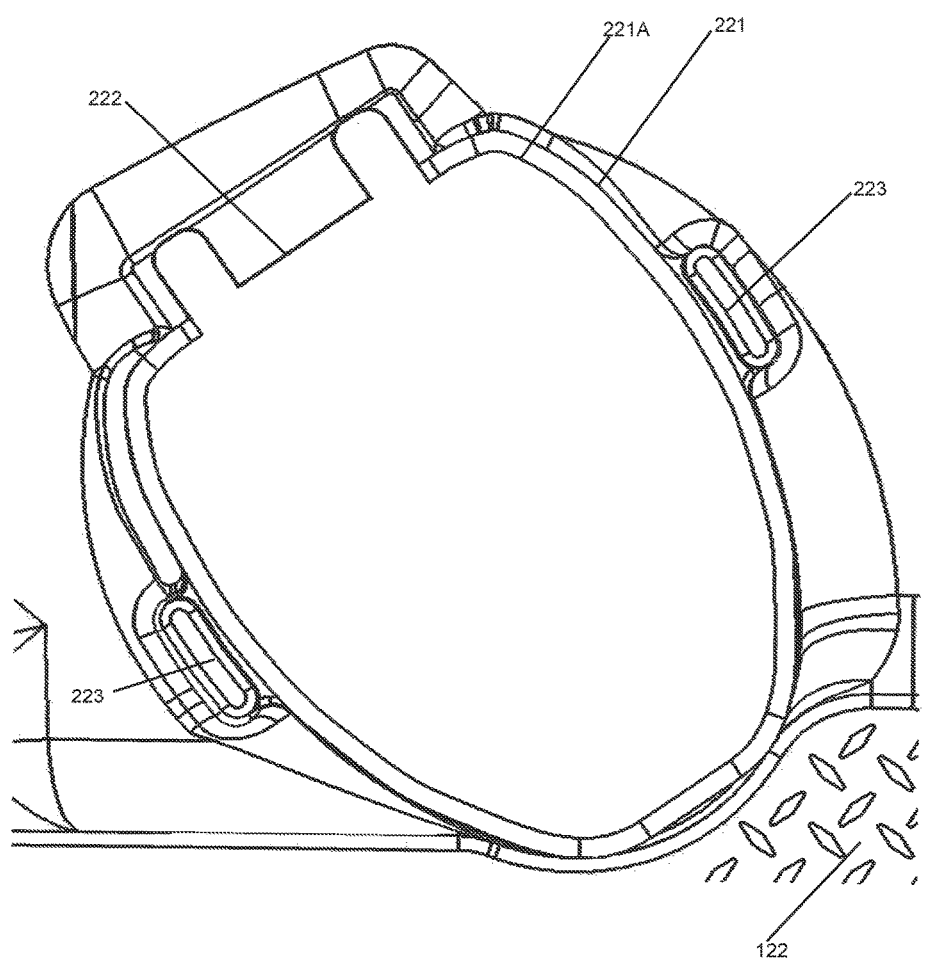
FIG. 26 illustrates a top plan view of a toilet seat and seat restraint or stops for use with the portable restroom of FIG. 1 according to one or more exemplary embodiments.
Figure 27:
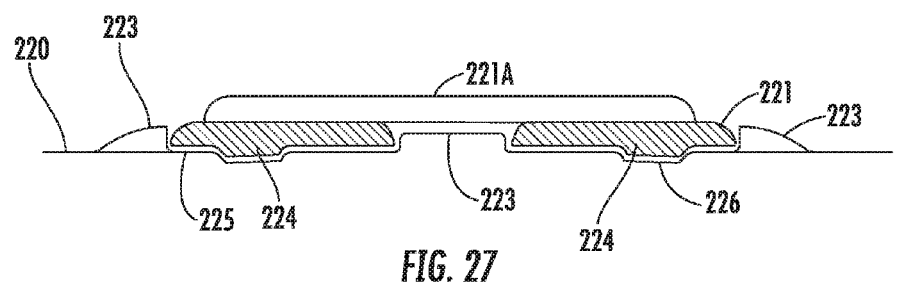
FIG. 27 illustrates a partial cross section, side elevation view of the toilet seat of FIG. 26 and corresponding seat support surface of the portable restroom tank of FIG. 1 according to one or more exemplary embodiments.

Another area at risk of damage in a portable restroom is the toilet seat 221 of the toilet module 220. In order to improve durability of the toilet seat, the portable restroom disclosed herein provides a toilet seat restraint. FIGS. 25-27 illustrate a toilet seat restraint. As shown in these Figures, the toilet seat includes a hinge end 222 with one or more conventional hinge(s) which are used to attach the seat base to the toilet structure with fasteners. Seat supports are also provided on the underside of the toilet seat. In addition to the foregoing, one or more seat restraints or stops 223 are provided on one or more sides of the toilet seat. The stops are protrusions which extend upward from the toilet structure adjacent the edge(s) of the toilet seat. One or more recesses 226 may also be provided in the seat support surface 225 of the toilet structure. The recesses 226 may be arranged and formed to receive the seat supports 224 on the underside of the toilet seat. As a result of the engagement of the recesses and seat supports, and use of stops, rotational movement of the toilet seat is restrained. In other words, rotational movement of the toilet seat is restrained by engaging the seat about its perimeter with stops 223 projecting upward from the seat support surface or engaging seat geometries that project downward from the underside of the seat. As a result, breakage due to rotational stress on the hinge is eliminated or reduced.

Figure 28:
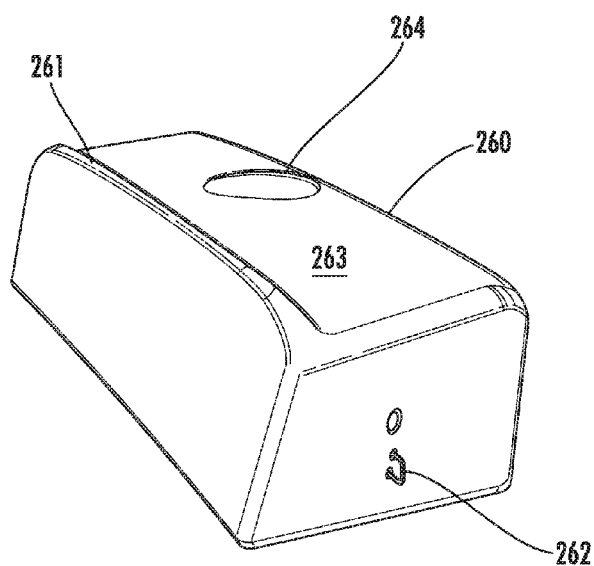
FIG. 28 illustrates a top right perspective view of a paper holder shelf with integrated nook for use with the portable restroom of FIG. 1 according to one or more exemplary embodiments.
Figure 29:
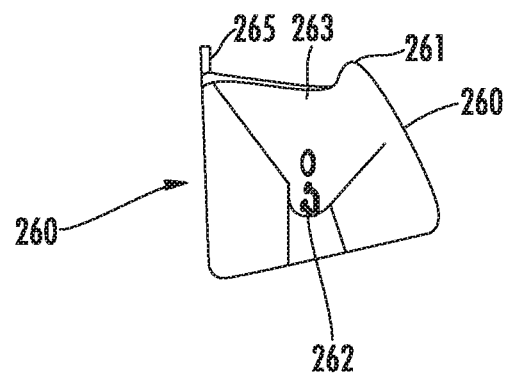
FIG. 29 illustrates a side elevation view of the paper holder shelf shown in FIG. 28 according to one or more exemplary embodiments.
Figure 30:
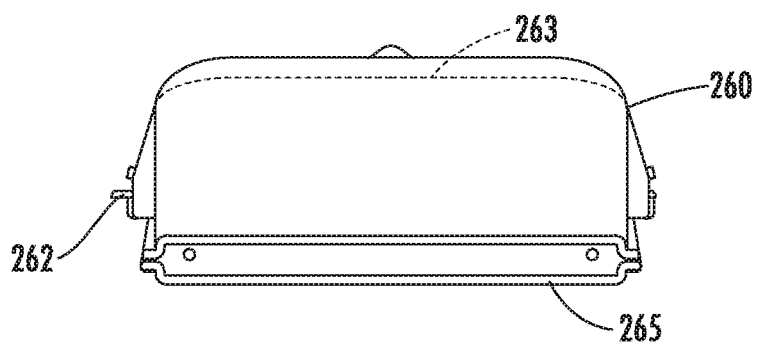
FIG. 30 illustrates a rear elevation view of the paper holder shelf shown in FIGS. 28-29 according to one or more exemplary embodiments.

As has been described herein, limited space exists in the interior of a portable restroom. The portable restroom described herein therefore provides a unique combined functional accessory which maximizes usable space and improves user comfort. Referring to FIGS. 28-30, a paper holder shelf 260 with integrated nook 261 is shown. The paper holder shelf with integrated nook may be attached to the wall using one or more fastening points and fasteners, or may be integrally molded with a wall (or possibly the door) of the portable restroom. The paper holder shelf with integrated hook comprises three components in one, namely, a paper dispenser or roll holder 262, a top shelf surface 263 for holding additional paper or other user items such as a phone, book, etc., and an integrated nook 261 which will retain a belt or handbag strap to keep such personal items off the floor of the portable restroom 110. In the illustrated embodiment, the paper is secured and dispensed from below by the dispenser or roll supports 262 extending horizontally within the body of the shelf unit 260. The roll supports may be secured or unsecured paper roll supports. In other words, the paper holder shelf with integrated nook offers geometries that accommodate both a secured and unsecured (e.g., snap in place) paper roll support 262. The top shelf surface 263 has a relatively flat or relatively horizontal surface for holding items placed thereon. The housing that includes the shelf surface and integrated hook at least partially surrounds or covers the paper held by the dispenser or roll supports. In the illustrated embodiment, an integrated nook 261 is formed as an upward extending lip or protrusion on the outer edge (opposite the wall attachment) of the paper holder shelf; although, alternative, specially formed hooks and the like may also be used with the present device. A fastening plate 265 on or within the back wall of the shelf unit 260 may be employed to fasten the shelf unit 260 to the sidewall 140 or 150. The shelf surface may also include one or more drains, including a slightly sloped but relatively horizontal top surface for causing liquid to drain off either side edge. In addition, the top shelf surface may include a cup-holder indent 264, as shown in FIG. 28, without adversely affecting the almost horizontal but slightly sloped and drainable character of the top surface. The paper holder shelf 260 with integrated nook 261 optimizes the usable space within the portable restroom interior and reduces the number of components and surface area requiring maintenance. As a result of the foregoing, user experience is enhanced without sacrificing valuable space within the portable restroom.

Figure 31:
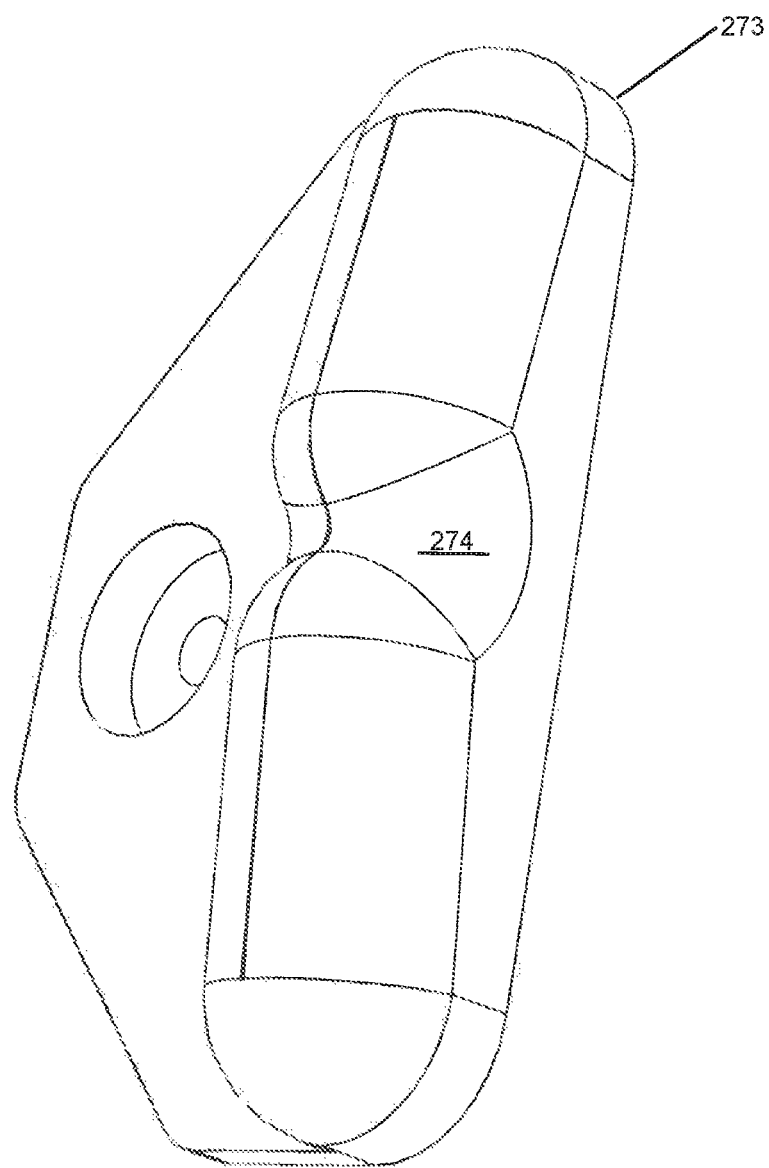
FIG. 31 illustrates a perspective view of a strain relief device for use with the portable restroom as shown in FIG. 3 according to one or more exemplary embodiments.
Figure 32:
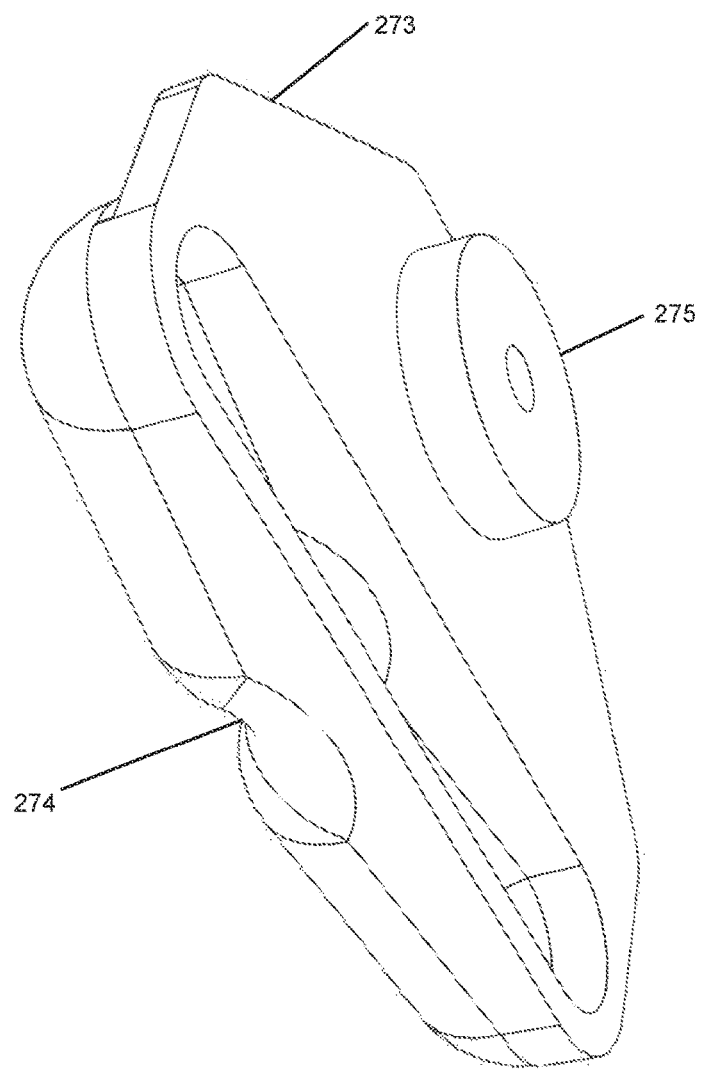
FIG. 32 illustrates an alternative perspective view of the strain relief device of FIG. 31 for use with the portable restroom according to one or more exemplary embodiments.
Figure 33:
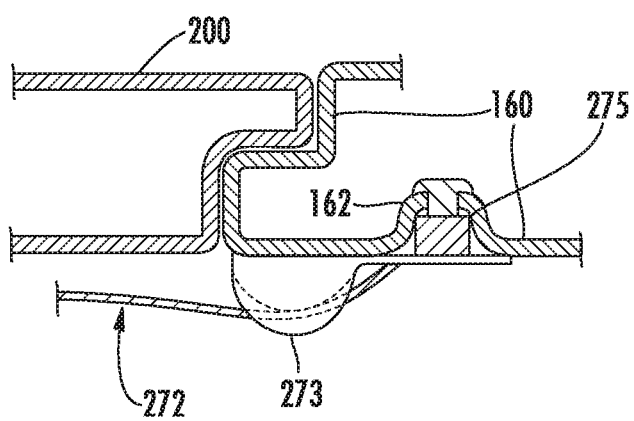
FIG. 33 illustrates a cut away cross-sectional view of the strain relief anchor of FIGS. 31-32 in use with wire rope lanyard and door according to one or more 'exemplary embodiments.

As indicated herein, portable restroom privacy is often provided by self-closing doors held shut by a closure device consisting of a spring and a polymer coated wire rope serving as a lanyard with a loop on the jamb end. In the improved portable restroom 110 of the invention as shown generally in FIG. 3, one end of the closure device 270 is attached to the door 200 and the other attached to the hinge side door jamb 160, as shown. Two such closure devices 270 are shown, one spaced from the top of the door and the other spaced from the bottom of the door. To prevent the wire rope portion 272 from locally deforming the component geometries it contacts as the door is opened, and the wire rope itself from being damaged by repeated sharp bending over the edge of the door jamb 160, a strain relief anchor sheave 273 is provided (see FIGS. 31-33). The strain relief anchor sheave 273 may be formed of a more rigid material than the portable restroom composition, and is inserted, generally, between the wire rope 272 and the restroom component geometries, namely between the inside surface and corner of jamb 160 and the wire rope 272 (see FIG. 33). The strain relief anchor sheave 273 is attached to the jamb 160. As a result, associated forces between the wire rope 272 and the jamb 169 are spread over a greater area, namely the convex sheave channel 274 through which the wire rope 272 is constrained and supported, thereby reducing or eliminating local deformation. The surfaces used which come into contact with the wire rope in traditional portable restrooms are often flat or abrupt. Both of these conditions put undue stress on the polymer coating of the wire rope, causing it to fail and producing high stress on the wire rope strands—often inducing a progressive failure of individual strands until total failure. The strain relief sheave reduces stress which leads to failure by providing cradled side support(s) forming a channel 274 therebetween, within which the wire rope 272 may be positioned and move. Additionally, stresses in or on the traditional anchoring fastener often cause the connection to fail, typically pulling out from the plastic wall of the jamb to which it is attached. The strain relief anchor sheave 273 incorporates a projection 275 that engages a matching depression 162 in the jamb which transfers some of the forces that cause the joint fastener failure to the surface of the jamb, thus significantly reducing the probably of joint failure.

Figure 34:
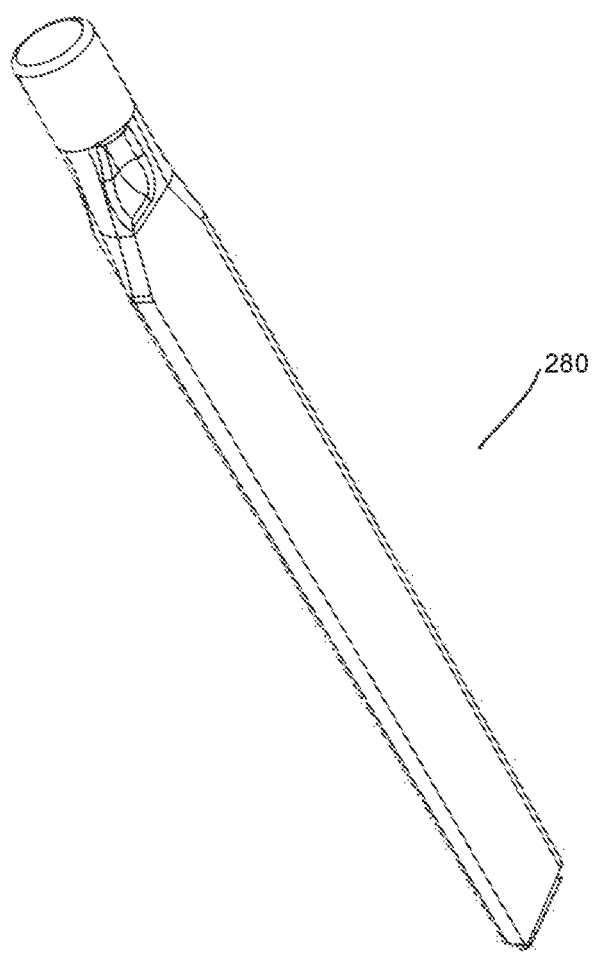
FIG. 34 illustrates a perspective view of a vent pipe for use with the portable restroom according to one or more exemplary embodiments.
Figure 35:
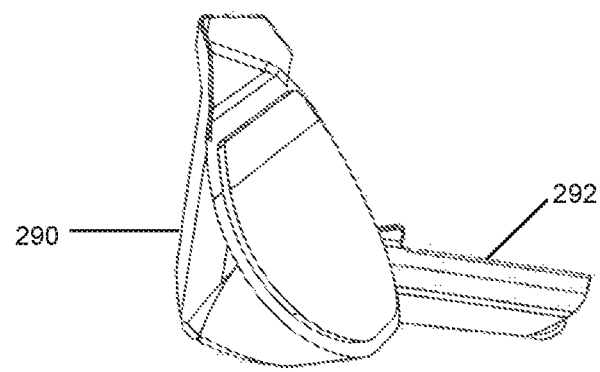
FIG. 35 illustrates a perspective view of a unitary urinal for use with the portable restroom according to one or more exemplary embodiments.
Figure 36:
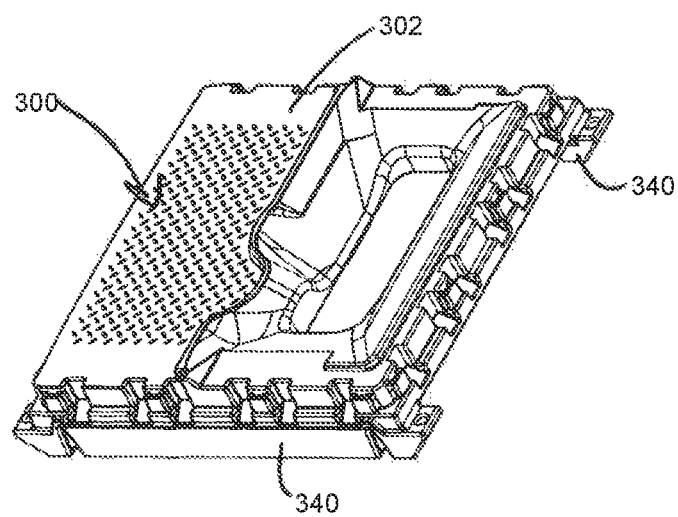
FIG. 36 is a top perspective view of a base for use with a portable restroom according to one or more exemplary embodiments.
Figure 37:
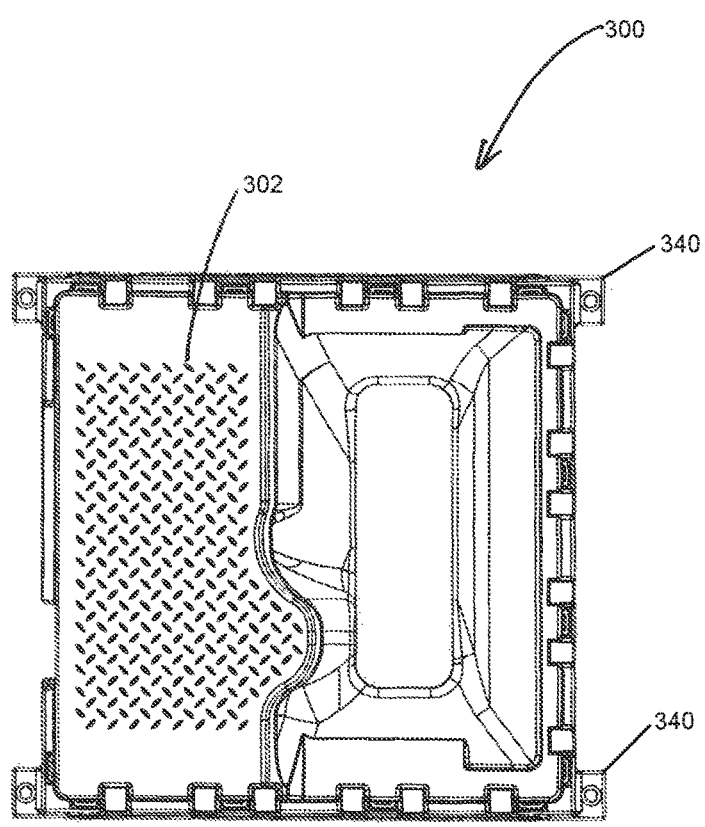
FIG. 37 is a top plan view of the base shown in FIG. 36.

Additional devices for use with the portable restroom are shown generally in FIGS. 34-35. FIG. 34 shows a conventional vent pipe 280 which is connected within the portable restroom at a rear corner thereof, as shown in FIG. 2. The vent pipe 280 extends from the interior portion of the holding tank 230, which is defined by the body of the toilet module 220 generally below the toilet seat 221, through the upper surface of the toilet module 220 and through the roof 210 of the portable toilet 110 to provide an elevated vent for the holding tank. Advantageously, the vent may be a molded in corner vent stack which prevents debris from collecting behind the stack. FIG. 35 shows a unitary urinal 290, the bowl of which is attached to the interior sides of the right side wall 150 and hinge side door jamb 160 in the front corner of the portable restroom, with a drain pipe 292 which extends from the urinal 290 into the holding tank 230. In one or more examples of embodiments, the urinal is a one piece corner urinal having clog resistant piping with a wider opening. A mounting platform for a hand-sanitizer (not shown) may be mounted above the urinal for preventing drips on the floor.

Figure 38:
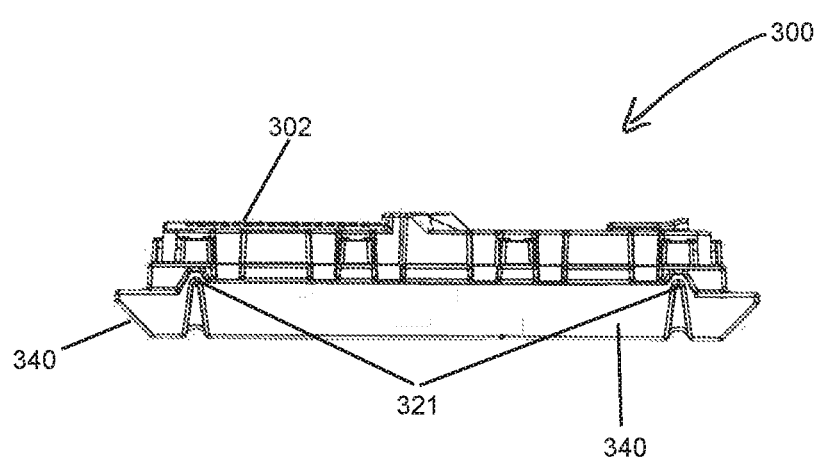
FIG. 38 is a side elevation view of the base shown in FIG. 36.
Figure 39:
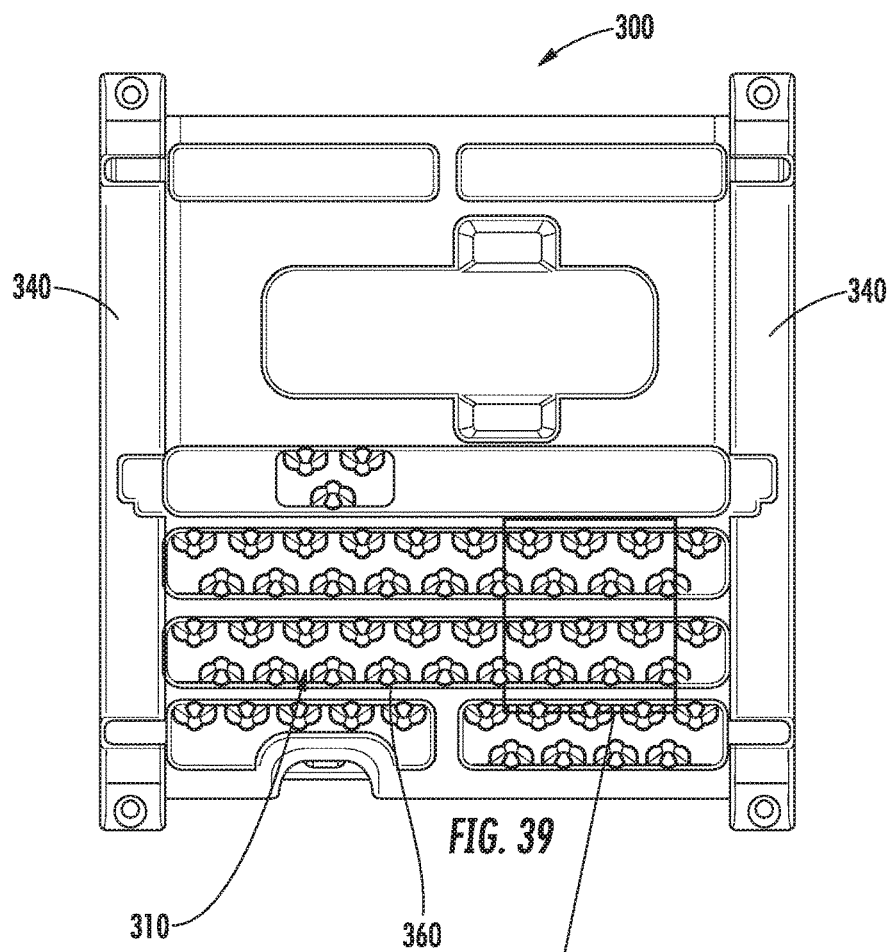
FIG. 39 is a bottom plan view of the base shown in FIG. 36.
Figure 40:
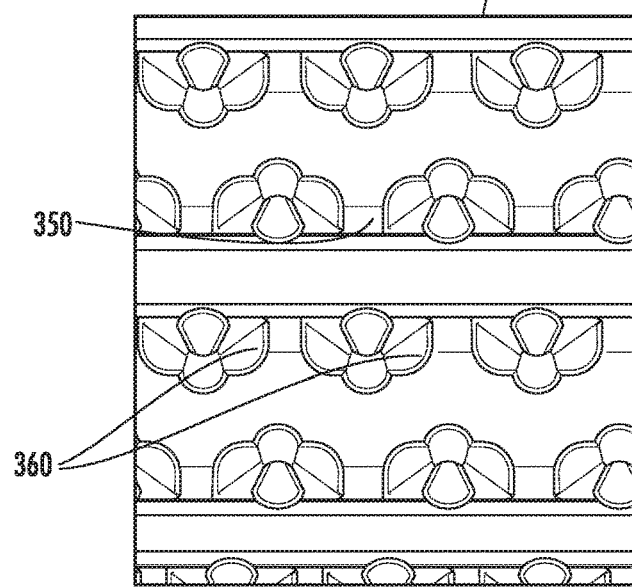
FIG. 40 is an enlarged partial view of the bottom view shown in FIG. 39.
Figure 43:
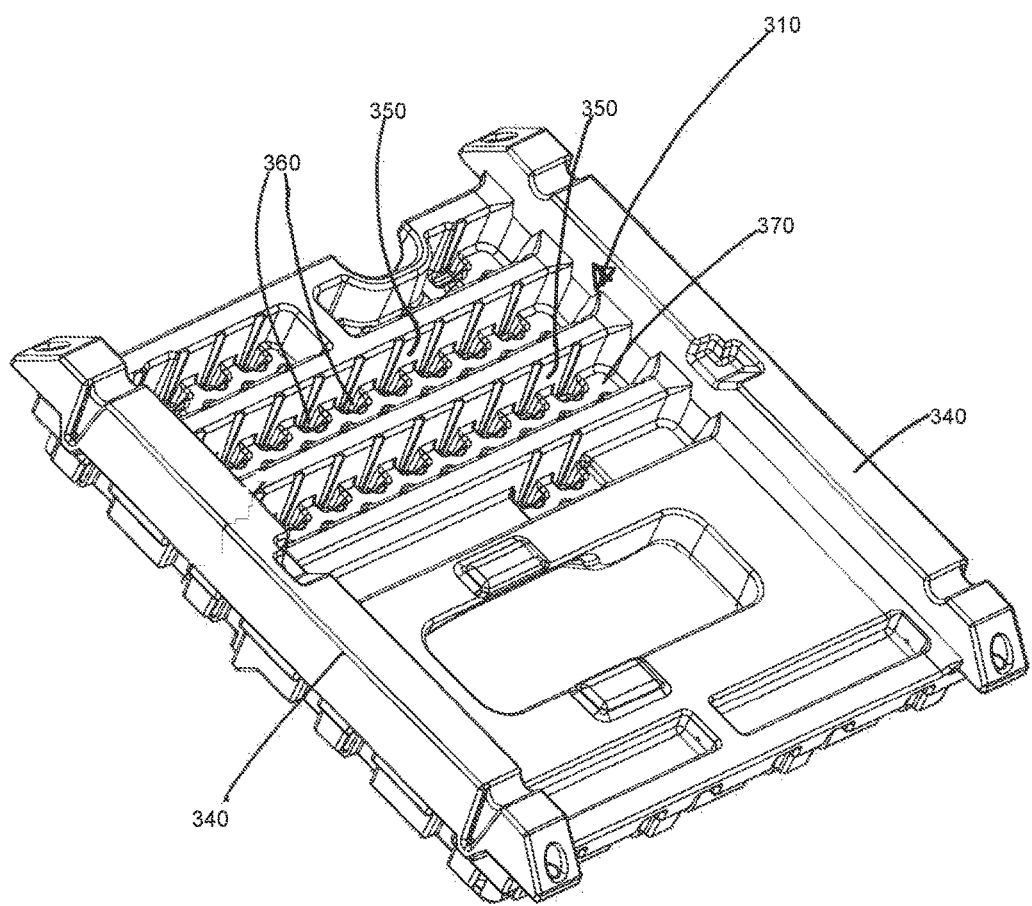
FIG. 43 is a bottom perspective view of the base shown in FIG. 36.
Figure 44:
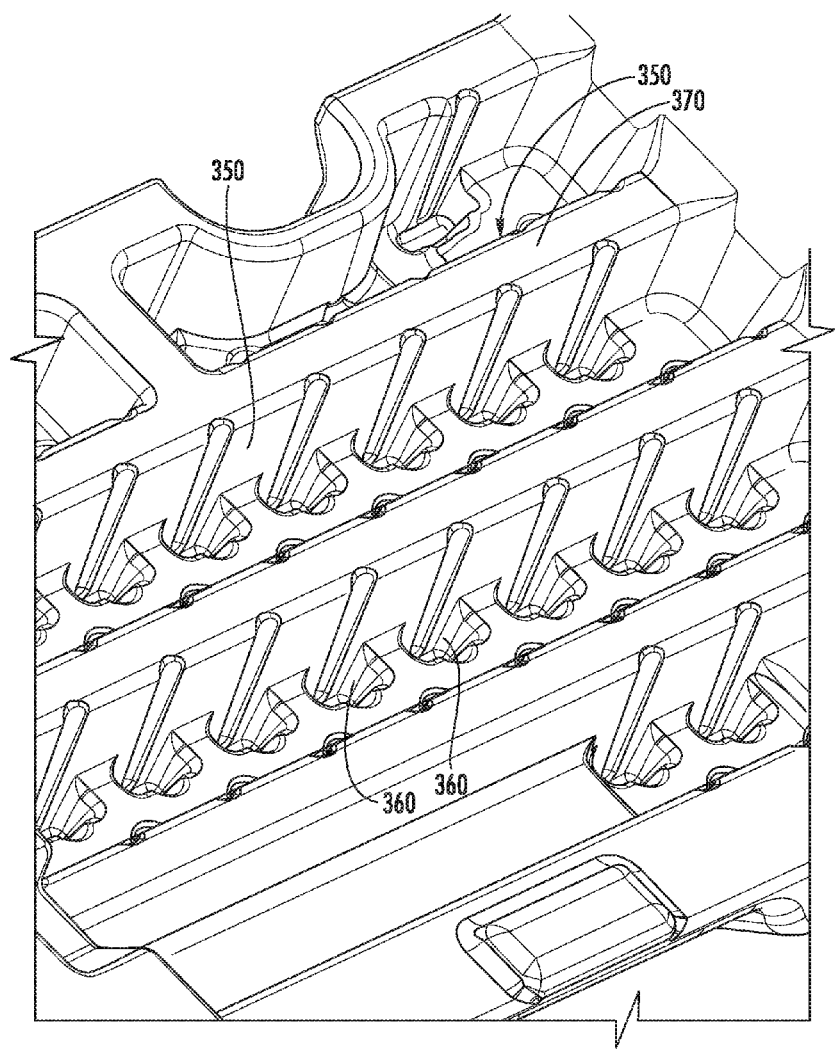
FIG. 44 is an enlarged partial view of the bottom view shown in FIG. 43.
Figure 45:
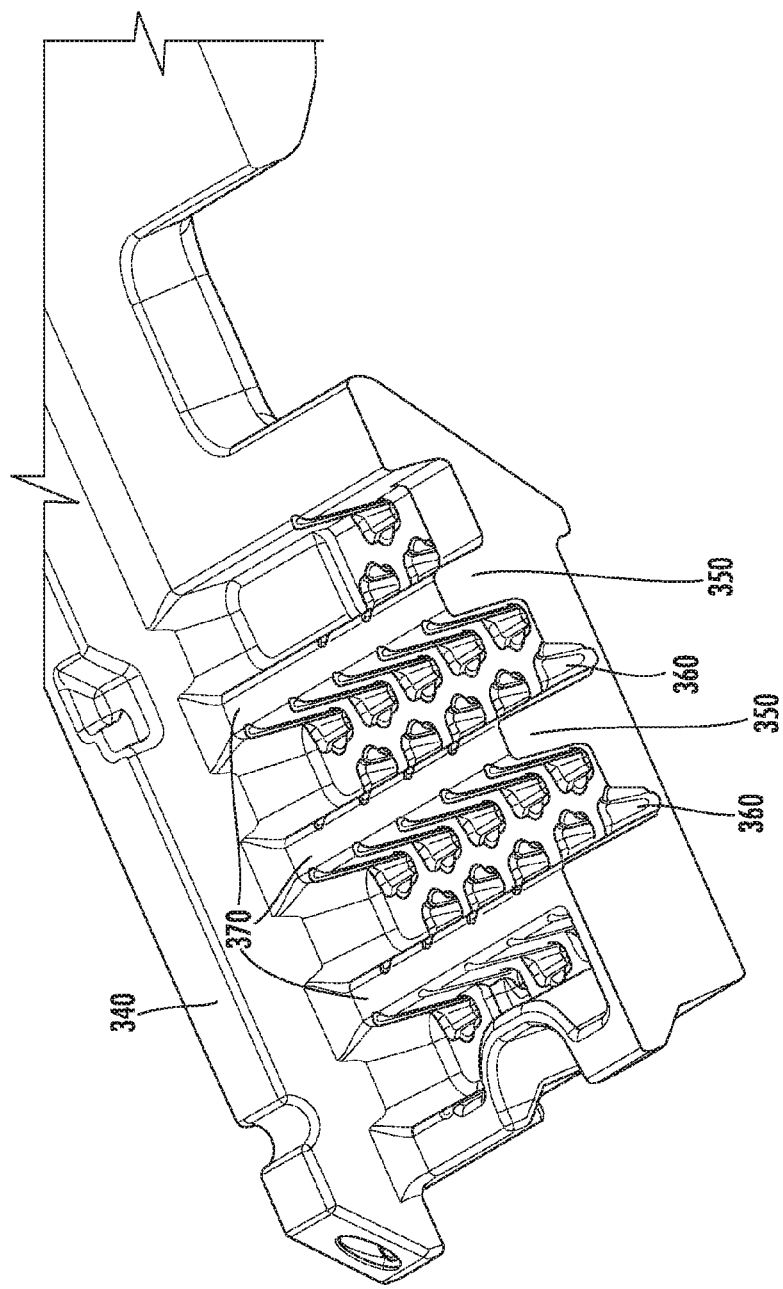
FIG. 45 is an enlarged partial view of the bottom view shown in FIG. 43.
Figure 46:
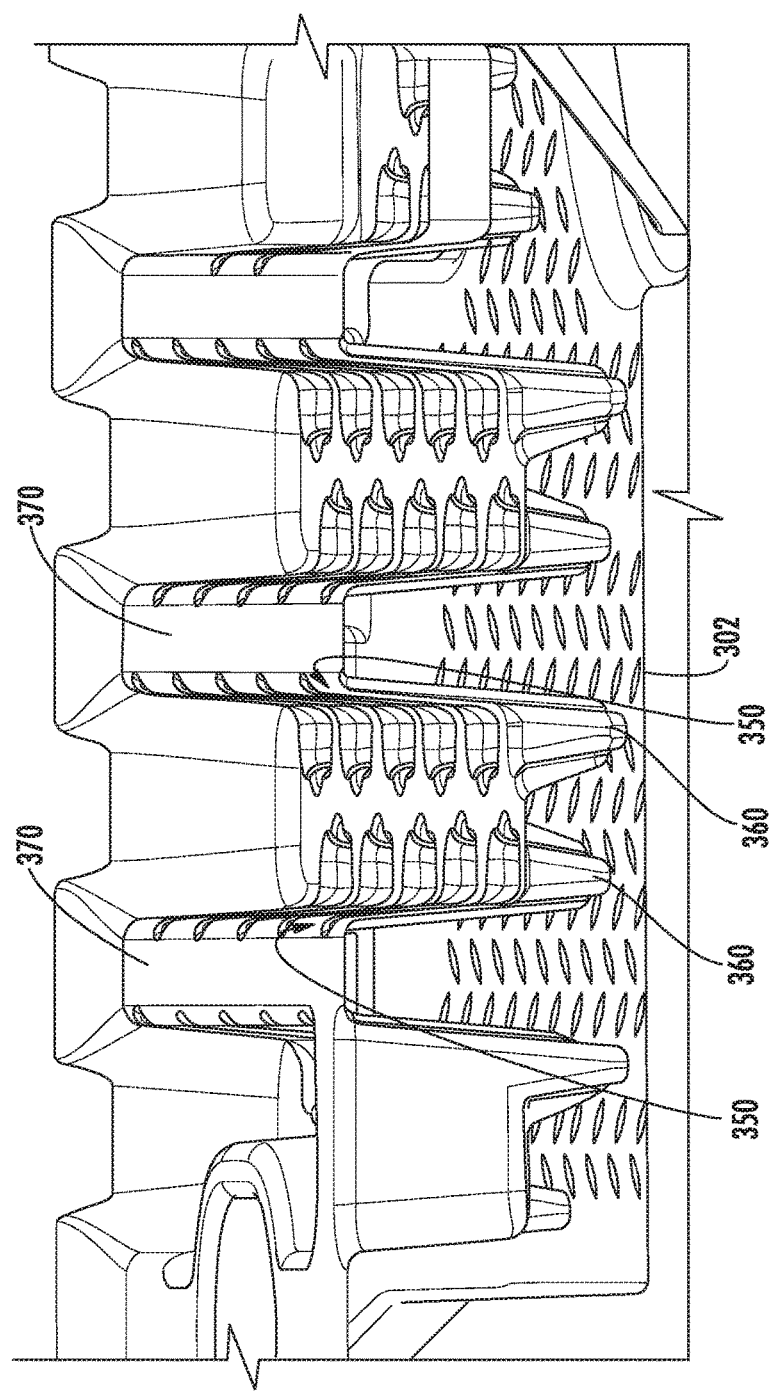
FIG. 46 is an additional partial enlarged cross-sectional view of the bottom view shown in FIG. 43.

As shown in FIGS. 36-47, an improved base 300 for a portable restroom is further provided. The improved base 300 includes a unique rib design arranged to securely and stably support an occupant of the portable restroom. To this end, the base 300 generally comprises a deck or deck top 302, a support structure 310 below the deck top and a plurality (e.g., two or more) ground supports or runners 340. The deck top may include a non-skid, no-slip tread floor surface. The support structure has a plurality of vertical walls 350 and near vertical ribs 360. As seen in FIG. 38, high lift bearings 321 may be utilized in the runners 340. As seen in FIGS. 39, 40 and 43-47, the vertical walls 350 span between the plurality of runners 340. A plurality of ribs 360 is also provided. The ribs 360 in the illustrated embodiment have a generally "flowerpot" type shape with a plurality of lobes. The ribs 360 are provided in an alternating pattern between adjacent vertical walls 350 and extend vertically from a recessed surface 380 toward the deck top 302 and may be in contact with the lower surface of the deck top 302 so as provide additional support thereto. Multiple rows of alternating rib 360 patterns are provided. These rib 360 patterns may be provided between vertical walls 350. Adjacent vertical walls 350 may further be joined by a horizontal surface 370 as shown in the Figures. According to one or more examples of embodiments, the base is formed of a plastic material and may be molded by a variety of means to form the shape set forth herein. The support structure (e.g., ribs and vertical walls) may further be surrounded by additional base structure to form the entirety of the base and to conceal any vacant space within the molded structure (see e.g., FIGS. 36, 38, 41-43).

Figure 47:
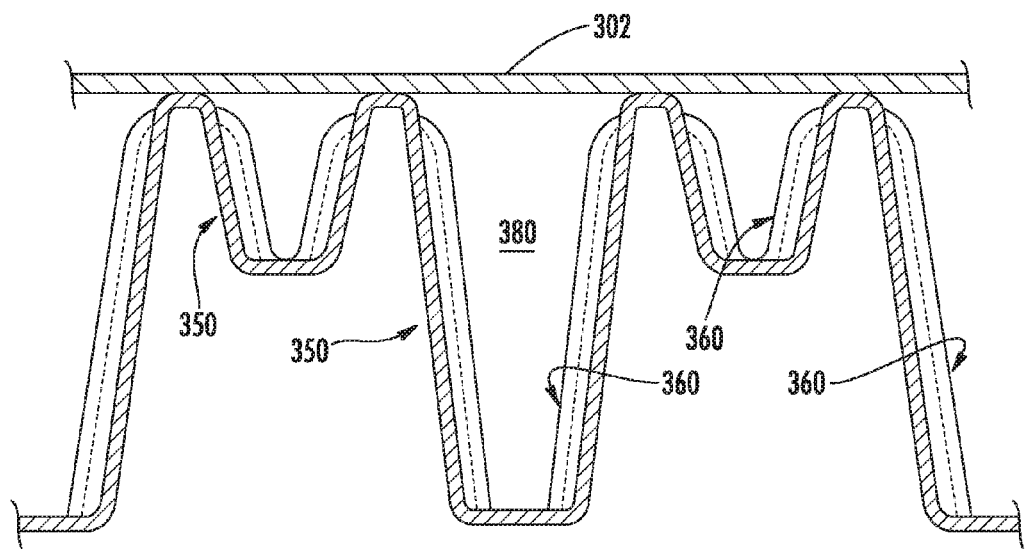
FIG. 47 is a partial cross-sectional illustration of the base shown in FIG. 36.

As shown in FIG. 47, a "tube" 380 is formed by three sides of the rib structure and the deck top 302. This tube extends between and is supported by the base's two runners 340 (e.g., ground supporting structure). The near vertical walls of the tube 380 are interrupted to form a system of supports. The vertical walls 350 of the system of supports may be further stiffened by a single vertical rib 360 on each side.

As shown in FIGS. 48-52, one or more examples of embodiments of hands-free door opening systems are disclosed which may be used with portable restrooms. These hands-free door opener systems may be retrofit to portable restrooms, or may be integrated into (e.g., molded or assembled into) one or more new designs that partially or completely open the door. Generally, a door mounted direct acting device (or plurality of such devices) which engage the foot, knee or elbow is (are) disclosed. One or more operator mechanisms, such as a pedal, a lever, a slide, or a similar device(s) may be mounted on or adjacent to the door, but which act directly upon the door, or remotely through cables or other flexible means of force transition in proportion to operator movement. One or more examples of manually operated mechanisms which activate spring-loaded or electric devices that open the door are also provided. While the systems described herein are discussed, designed, and intended to be used without hands, one of skill in the art would understand that a user may elect not to take advantage of the device's hands-free capability and instead use a hand to grasp or activate the described opener without departing from the overall scope of the present invention. The hands-free openers described herein may be formed of any suitable durable material, including for example, metal or plastic, by suitable means, and may be formed integrally with one or more components of the portable restroom or may be formed separately and secured to the portable restroom by a suitable mechanism.

More specifically, referring to FIGS. 48a-f, a handle-style hands-free door opener is disclosed. The handle may be engaged by the foot or elbow. As can be seen in FIG. 48a, the handle 400 has two surface engaging areas 402, 404 which engage a corresponding surface 406, such as a door. The handle 400 may be mounted on either a flat mounting surface of the portable restroom (and in particular the door) or a mounting surface formed with a recess 407 or area of clearance (such as may provide clearance for engagement by a user's elbow or foot). Accordingly, the handle 400 may also have a foot or elbow engaging area 408. Alternatively, the handle 400 may be formed with sufficient clearance 409 for the foot or elbow (see, e.g., FIG. 48c).

The handle 400 may be provided with various surfaces for engagement with the user's foot. For example, referring to FIGS. 48a, 48b and 48b$^1$ the handle 400 may have a roughened and/or sloped surface 410 or 412 to engage the user's foot, or sole of the foot or footwear. Alternatively, or additionally, the handle 400 may have a rounded surface to engage the toe of the foot or footwear. As shown in FIG. 48b$^1$, the top of the handle 400 has a roughened and/or sloped surface 412, while the bottom of the handle has a rounded surface 414, such that a user may elect either option for hands-free operation.

In one or more alternative examples of embodiments (shown in FIG. 48d), a handle 416 may be provided which is secured to the surface or door on only one end, or has one surface engaging area, forming an open end on the side opposing the engaging area. The open end version of the handle 416 accommodates side, bottom and top engagement by the user for opening the door. An example of use of the open end handle 416 is shown in FIG. 48f, in which a user's toe 418 is engaged with the handle 416.

In one or more further alternative embodiments, an example of which is shown in FIG. 48e, the handle 420 may have a central engagement section 422 which is secured to the surface or door, and two extensions 424, 426 therefrom, such as but not limited to curved sections, extending away from the surface or door, one of which may be a sole engaging section 426, the other of which may be a toe engaging section 424.

Figure 49C:
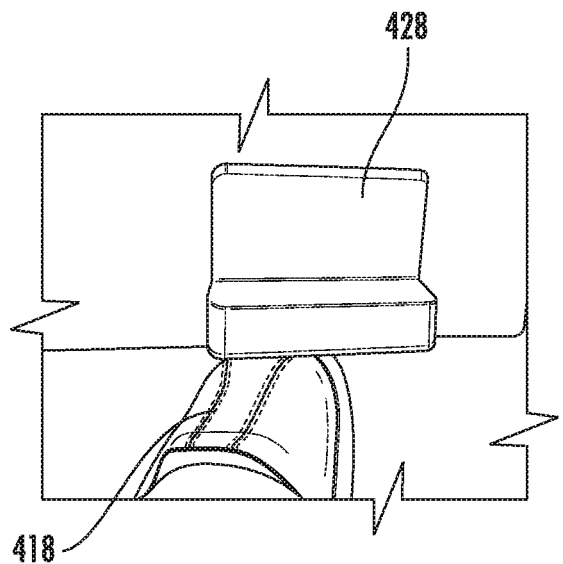
FIG. 49$a$ is a side elevation view of one or more examples of embodiments of a cup-style foot and elbow portable restroom door opener.
Figure 49D:
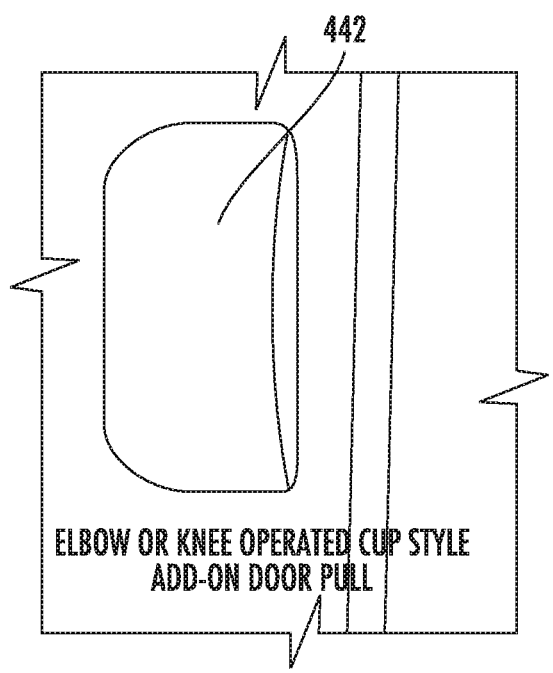

Referring to FIGS. 49a-49d, one or more examples of a cup-style foot or elbow engaging door opener for a portable restroom are provided. The cup-style hands-free door opener 428, 430 has a surface engaging area 432 for securing the opener to the surface, such as a door, and a foot or elbow engaging area 434 extending therefrom. As can be seen in FIGS. 49a & 49a$^1$ the cup-style hands-free door opener 428, 430 has a crowned and/or sloped and roughened top surface 436 to engage the bottom of the foot or footwear. The cup-style hands-free opener 428, 430 also has a downwardly facing opening or recess 438 and a rounded or smoothed bottom edge 440, designed to form a "cup" which engages the toe of the foot or footwear, but may also be used to engage a knee or elbow. In the embodiment shown in FIG. 49a, the cup-style hands-free opener 428 is secured to another surface, such as a door, by two surface engaging areas 432. In an alternative embodiment, such as shown in FIG. 49b, the cup-style door opener 430 has only one surface engaging area 432, forming an open end which permits top, bottom and side engagement. Additional surface engaging areas may also be provided. FIG. 49c illustrates a cup-style hands-free door opener 428 in use. In FIG. 49c, a user's foot 418, and specifically, the user's toe or footwear is engaged with the downward facing opening or recess 438 of the cup. FIG. 49d illustrates an alternative example of an elbow or knee operated cup-style door opener 442. In the illustrated embodiment, the open recess or end is horizontally oriented for engagement with the relevant user body part.

As can be seen in FIG. 50, a portable restroom may be provided with one or more hands-free door opener systems. In the example shown in FIG. 50, one or more pedals and/or buttons are strategically placed, which devices operate levers or cams that open the portable restroom door sufficiently to engage an elbow or shoulder with the door (e.g., via a gap created between the door and the door frame). For example, a door opening button or pedal 444, 446, 448 located along the door edge 450 and/or bottom 452 may be provided. Additionally, or alternatively, an elbow operated door opening cup-style 428 (or 430 or 442) or handle-style 400 (or 416 or 420) hands-free door opener may be provided on the door near the door edge in a location typical for current door handles. A knee engageable door pull 454 may be provided at a location below the elbow operated door pull, but above the bottom of the door such as shown in FIG. 50. Likewise, a foot operated door opener 456 may also be provided at the base of the door such as is shown in FIG. 50. The knee engageable door pull 454 and foot operated door opener 456 may be substantially the same as the cup-style or handle-style door opener, or may be different and arranged to accommodate a user's insertion of a knee and movement of the door therewith. A pedal or button 448 may also be provided on the base of the portable restroom as indicated.

A pedal lever may also be used for hands-free operation. FIG. 51 illustrates an example of operation of a pedal lever 458. As can be seen, the pedal 460 operates a lever 462 which acts directly on the door 464, or indirectly through a linkage (e.g., cables, chains, etc.). The pedal 460 extends at an angle less than 180 degrees from the lever 462 in FIG. 51, and causes the lever 462 to pivot about a central pivot point 466 formed by the apex of the angle connecting the two components. Door movement may then be proportional to depression of the pedal by the user. As a result, the pedal permits the user to open the portable restroom door with a foot, or if positioned higher the elbow.

FIG. 52 illustrates an alternative example of embodiments of a hands-free door opener, showing use of an actuator. In particular, FIG. 52 shows an example of indirect operation through a linkage. A button 468 on the restroom sidewall or door frame 470 is linked to the opener 472, e.g., an actuator, by a cable, linkage or wire 474. The depression of the button 468 may cause an engaged pawl 476, which has retained a tensioned actuator 478 (e.g., tensioned by a spring), to release, thereby pushing the door 480 open. The actuator 478 may be a spring loaded piston or like device, or alternatively may be an electrically operated mechanism. Door movement may also be proportional to actuator movement.

As indicated, in one or more examples of embodiments, the door opener devices may be "add-on" components (e.g. retrofit). In these systems, as well as in newly formed portable restrooms, the hands-free door opener may be provided on or mounted to a sub plate 482 (see FIG. 50) for increased durability or other purposes, either permanently or with temporary fastener systems for easy removal and installation. The hands-free devices described herein may also be directly mounted to the portable restroom, either permanently or with temporary fastener systems. To this end, the hands-free devices may be provided with one or more apertures for insertion of a fastener. While specific examples are provided herein, various alternatives and modifications may be made consistent with the purposes provided.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

What is claimed is:
1. A portable restroom assembly comprising:
a base, at least three walls, a door, a door jamb, and a roof forming an enclosure containing a toilet module with a holding tank; and
a hands-free door opening system;

wherein the base comprises a base recessed area along a front of the base, and wherein the hands-free door opening system comprises a door recessed segment on an interior bottom surface the door aligned with the base recessed area providing a clearance area for receipt of a portion of a user's foot such that the door may be opened through engagement of the user's foot with the door in the clearance area.

2. The portable restroom assembly of claim 1, wherein the hands-free door opening system further comprises a door mounted direct acting device which engages the foot, knee or elbow.

3. The portable restroom assembly of claim 1, wherein the hands-free door opening system further comprises a device selected from the group consisting of a pedal, a lever, a slide, and combinations of the foregoing.

4. The portable restroom assembly of claim 1, wherein the hands-free door opening system further comprises a manually operated mechanism which activates a linked device which opens the door.

5. The portable restroom assembly of claim 1, wherein the hands-free door opening system comprises a cup proximate the interior bottom surface of the door and parallel to the base recessed area providing the clearance area for receipt of a portion of a user's foot such that the door may be opened through engagement of the user's foot with the door in the clearance area.

\* \* \* \* \*